United States Patent
Koshikawa et al.

(10) Patent No.: US 10,017,677 B2
(45) Date of Patent: Jul. 10, 2018

(54) HEAT-CONDUCTIVE FLUORINATED CURABLE COMPOSITION, CURED PRODUCT THEREOF, AND ELECTRIC/ELECTRONIC PART

(71) Applicant: Shin-Etsu Chemical Co., Ltd., Tokyo (JP)

(72) Inventors: Hidenori Koshikawa, Annaka (JP); Akihiro Endo, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 15/332,476

(22) Filed: Oct. 24, 2016

(65) Prior Publication Data

US 2017/0121583 A1    May 4, 2017

(30) Foreign Application Priority Data

Oct. 28, 2015 (JP) ................. 2015-211935

(51) Int. Cl.
| | |
|---|---|
| *C09K 5/14* | (2006.01) |
| *C08L 71/00* | (2006.01) |
| *C08K 3/22* | (2006.01) |
| *C09K 5/08* | (2006.01) |
| *C08L 83/04* | (2006.01) |
| *C09C 3/12* | (2006.01) |
| *C08K 7/18* | (2006.01) |

(52) U.S. Cl.
CPC ............. *C09K 5/08* (2013.01); *C08K 3/22* (2013.01); *C08L 71/00* (2013.01); *C08L 83/04* (2013.01); *C09K 5/14* (2013.01); *C08K 7/18* (2013.01); *C08K 2003/2227* (2013.01); *C08K 2201/001* (2013.01); *C08K 2201/005* (2013.01); *C09C 3/12* (2013.01)

(58) Field of Classification Search
CPC .......... C08L 71/00; C08L 71/02; C08L 83/04; C08K 2003/2227
See application file for complete search history.

(56) References Cited

U.S. PATENT DOCUMENTS

| | | | |
|---|---|---|---|
| 5,665,846 | A | 9/1997 | Sato et al. |
| 8,383,005 | B2 | 2/2013 | Tsuji et al. |
| 8,865,820 | B2 | 10/2014 | Matsuda et al. |
| 2015/0240075 | A1* | 8/2015 | Imada ................. C08J 5/00 524/430 |

FOREIGN PATENT DOCUMENTS

| | | |
|---|---|---|
| JP | 8-22944 | 3/1996 |
| JP | 2938428 | 8/1999 |
| JP | 2990646 | 12/1999 |
| JP | 3952184 | 8/2007 |
| JP | 2010-232535 | 10/2010 |
| JP | 5246190 | 7/2013 |
| JP | 5553006 | 7/2014 |
| JP | 2015-67736 | 4/2015 |
| JP | 2015-67737 | 4/2015 |
| WO | WO 2014/034508 A1 * | 3/2014 |

OTHER PUBLICATIONS

Internet page from the Asker site with the url http://www.asker.co.jp/en/products/durometer/analog/e/.*
Product data page for Demnum line of products.*

* cited by examiner

*Primary Examiner* — Marc S Zimmer
(74) *Attorney, Agent, or Firm* — Oblon, McClelland, Maier & Neustadt, L.L.P.

(57) ABSTRACT

A heat-conductive fluorinated curable composition is provided comprising (A) an alkenyl-containing linear polyfluoro compound, (B) a fluorinated organohydrogensiloxane having a fluorinated organic group and SiH groups, (C) a platinum catalyst, (D) a heat-conductive filler, and (E) a fluorinated organosilicon compound having a fluorinated organic group and an alkoxy group. The composition allows for heavy loading of the heat-conductive filler and cures into a cured product having improved oil resistance and thermal conductivity.

20 Claims, No Drawings

HEAT-CONDUCTIVE FLUORINATED CURABLE COMPOSITION, CURED PRODUCT THEREOF, AND ELECTRIC/ELECTRONIC PART

CROSS-REFERENCE TO RELATED APPLICATION

This non-provisional application claims priority under 35 U.S.C. § 119(a) on Patent Application No. 2015-211935 filed in Japan on Oct. 28, 2015, the entire contents of which are hereby incorporated by reference.

TECHNICAL FIELD

This invention relates to a heat-conductive fluorinated curable composition, a cured product thereof, and an electric/electronic part using the cured product.

BACKGROUND ART

Patent Document 1 discloses a curable composition comprising a linear fluoropolyether compound containing at least two alkenyl groups in the molecule and having a perfluoropolyether structure in its backbone, a fluorinated organohydrogensiloxane having at least two silicon-bonded hydrogen atoms in the molecule, and a platinum group compound. The composition cures into a cured product having a good profile of heat resistance, chemical resistance, solvent resistance, mold release, water repellency, oil repellency, and low-temperature properties.

Patent Document 2 describes that the cured product of the above-mentioned composition is improved in acid resistance by modifying the linear fluoropolyether compound.

It is known that many electric/electronic parts such as CPUs, power transistors and LSIs lose their performance by the heat release during service. Various heat-dissipating techniques are used for removing heat from these parts. Typical examples are heat-dissipating grease and sheets of thermosetting silicone rubber compositions having heat-conductive fillers added thereto (see Patent Documents 3 to 5). Heat-conductive materials in the form of such silicone rubbers (cured products of thermosetting silicone rubber compositions) find increasing applications in the automotive field because of their heat resistance, weather resistance, and electrical insulation. For example, the heat-conductive materials are used in LED headlamps and engine control units (ECUs) as well as in batteries, motors and converters mounted on next-generation automobiles including hybrid cars and electric vehicles.

However, silicone rubbers are prone to swell or degrade by solvents such as toluene, alcohols and gasoline. When used in an environment exposed to automobile fluids such as ATF or CVTF, heat-conductive materials based on silicone rubber are difficult to maintain their performance. To address the problem, heat-conductive materials based on fluoro-rubber are recently proposed.

For instance, Patent Document 6 discloses a composition comprising a perfluoropolyether compound and a heat-conductive filler as the heat-dissipating fluorinated grease having heat transfer properties. Patent Document 7 describes that a heat-resistant heat-dissipating sheet is obtained by mixing a liquid fluorinated polyether and a heat-conductive filler and reactive curing.

Besides, Patent Document 8 describes that a heat-conductive rubber sheet is obtained by heating a composition comprising a compound having a perfluoroalkylether structure in its backbone and a hydrosilyl group at the molecular end, a compound having a perfluoroalkylether structure in its backbone and an alkenyl group at the molecular end, and a heat-conductive filler. Patent Document 9 proposes to add an electro-conductive filler to the composition of Patent Document 8, and a cured product of the resulting composition serves as a heat-conductive sheet.

The heat-conductive materials described in Patent Documents 6 to 9, however, have problems that when the amount of heat-conductive filler added to the composition is increased to improve heat conduction, the composition does not become grease because of non-uniform dispersion of the filler in the composition or has an extremely high viscosity that interferes with working or shaping.

CITATION LIST

Patent Document 1: JP 2990646 (U.S. Pat. No. 5,665,846)
Patent Document 2: JP 5246190 (U.S. Pat. No. 8,865,820)
Patent Document 3: JP 2938428
Patent Document 4: JP 5553006 (U.S. Pat. No. 8,383,005)
Patent Document 5: JP 3952184
Patent Document 6: JP-A H08-22944
Patent Document 7: JP-A 2010-232535
Patent Document 8: JP-A 2015-067736
Patent Document 9: JP-A 2015-067737

SUMMARY OF INVENTION

An object of the invention is to provide a heat-conductive fluorinated curable composition which may be heavily loaded with a heat-conductive filler and cure into a cured product having improved oil resistance and heat conduction, a cured product thereof, and an electric/electronic part using the cured product.

The inventors have found that as long as a heat-conductive filler is pretreated with a surface treating agent, specifically a fluorinated organosilicon compound having at least one monovalent perfluoroalkyl or monovalent perfluorooxyalkyl group and at least one silicon-bonded alkoxy group in the molecule and free of a silicon-bonded hydrogen atom, a fluorinated curable composition can be loaded with a large amount of the heat-conductive filler and cured into a cured product having improved oil resistance and heat conduction.

In a first aspect, the invention provides a heat-conductive fluorinated curable composition comprising:

(A) 100 parts by weight of a linear polyfluoro compound containing at least two alkenyl groups in the molecule and having a perfluoropolyether structure in its backbone, (B) a fluorinated organohydrogensiloxane having a monovalent perfluoroalkyl, monovalent perfluorooxyalkyl, divalent perfluoroalkylene or divalent perfluorooxyalkylene group and at least two silicon-bonded hydrogen atoms (i.e., SiH groups) in the molecule, and being free of a silicon-bonded alkoxy group, component (B) being present in an amount to give 0.50 to 3.0 moles of SiH groups per mole of alkenyl groups in the composition, (C) a platinum group metal based catalyst in an amount to give 0.1 to 2,000 ppm of platinum group metal based on component (A), (D) 100 to 4,000 parts by weight of a heat-conductive filler, and (E) 0.01 to 300 parts by weight of a fluorinated organosilicon compound having at least one monovalent perfluoroalkyl or monovalent perfluorooxyalkyl group and at least one silicon-bonded alkoxy group in the molecule, and being free of a SiH group, the composition curing into a fluorinated cured product having a thermal conductivity of at least 1.0 W/m·K at 25° C.

In a preferred embodiment, the composition may further comprise (F) 0.1 to 300 parts by weight of at least one non-functional polyfluoro compound selected from compounds having the general formulae (1) and (2):

$$F—(CF_2CF_2CF_2O)_a\text{-}A \tag{1}$$

wherein A is a group: $—C_bF_{2b+1}$ wherein b is an integer of 1 to 3, and a is an integer of 1 to 500,

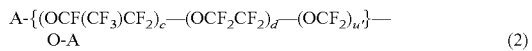

$$A\text{-}\{(OCF(CF_3)CF_2)_c—(OCF_2CF_2)_d—(OCF_2)_{u'}\}—O\text{-}A \tag{2}$$

wherein A is as defined above, c and d each are an integer of 0 to 300, and u' is an integer of 1 to 300, excluding that both c and d are 0.

In a preferred embodiment, the composition may further comprise (G) 0.1 to 100 parts by weight of a polyfluoromonoalkenyl compound containing one alkenyl group in the molecule and having a perfluoropolyether structure in its backbone.

Preferably, the linear polyfluoro compound (A) has an alkenyl content of 0.0050 to 0.300 mole/100 g.

In a preferred embodiment, the perfluoropolyether structure in component (A) contains a structure of the general formula (3):

$$—(C_mF_{2m}O)_n— \tag{3}$$

wherein m is an integer of 1 to 6 and n is an integer of 1 to 300.

In a preferred embodiment, component (A) is at least one linear polyfluoro compound selected from compounds having the general formulae (4) and (5):

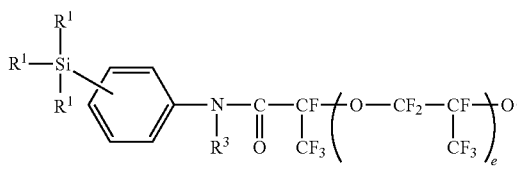

wherein $R^1$ and $R^2$ are each independently alkenyl or a substituted or unsubstituted monovalent hydrocarbon group free of aliphatic unsaturation, with the proviso that at least two of groups $R^1$ and $R^2$ are alkenyl, $R^3$ is each independently hydrogen or a substituted or unsubstituted monovalent hydrocarbon group, e and f each are an integer of 1 to 150, the sum of e+f is 2 to 300 on average, and g is an integer of 1 to 6, wherein $R^4$ is each independently a $C_1$-$C_6$ alkylene group, $R^5$ is each independently hydrogen or an optionally fluorinated $C_1$-$C_4$ alkyl group, and $R^1$, $R^2$, e, f and g are as defined above.

Typically, component (D) is at least one filler selected from the group consisting of metals, metal oxides, metal nitrides, metal hydroxides, metal carbides, soft magnetic alloys, and ferrites. More preferably, component (D) is alumina. Further preferably, component (D) is irregular alumina and/or spherical alumina. Specifically, the irregular alumina has an average particle size of 0.2 to 5.0 µm, and the spherical alumina has an average particle size of 5.0 to 100 µm.

In a preferred embodiment, component (E) is a fluorinated organosilicon compound having at least one monovalent perfluoroalkyl or monovalent perfluorooxyalkyl group which is bonded to the silicon atom having alkoxy directly bonded thereto, via a divalent hydrocarbon group which may contain carbon, silicon, oxygen and nitrogen atoms. More preferably, component (E) is a fluorinated organosilicon compound having the general formula (6):

$$D_{g'}R^{14}{}_{h'}Si(OR^6)_{4\text{-}g'\text{-}h'} \tag{6}$$

wherein D is each independently a monovalent perfluoroalkyl or monovalent perfluorooxyalkyl group which is bonded to the silicon atom having alkoxy directly bonded thereto, via a divalent hydrocarbon group which may contain carbon, silicon, oxygen and nitrogen atoms, $R^6$ is each independently $C_1$-$C_6$ alkyl, $R^{14}$ is each independently a substituted or unsubstituted monovalent hydrocarbon group, g' is an integer of 1 to 3, h' is an integer of 0 to 2, and the sum of g'+h' is an integer of 1 to 3.

In a preferred embodiment, component (E) has a weight loss of no more than 50.0% by weight upon heating at 105° C. for 3 hours.

In a preferred embodiment, component (G) is a polyfluoromonoalkenyl compound having the general formula (7):

$$Rf—(Y)_h—CH=CH_2 \tag{7}$$

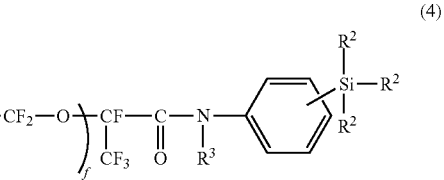

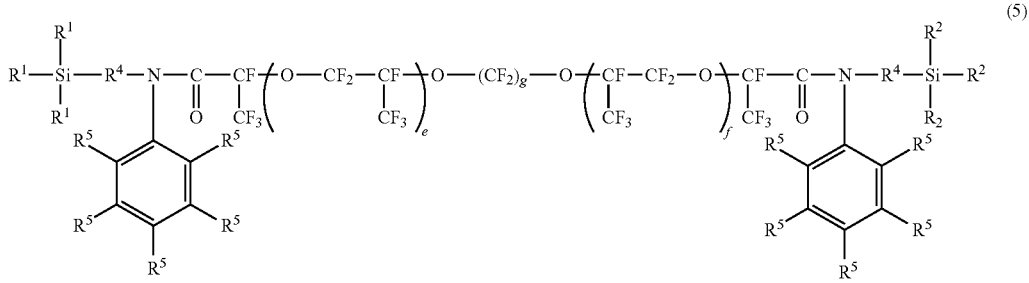

wherein Rf is a group having the formula (8):

$$F—[(CF(CF_3)CF_2O]_i—C_jF_{2j}— \quad (8)$$

wherein i is an integer of 1 to 200 and j is an integer of 1 to 3, Y is —CH$_2$—, —OCH$_2$—, —CH$_2$OCH$_2$— or —CO—NR$^{15}$—Z—, which is bonded at the left end to Rf and at the right end to the carbon atom, R$^{15}$ is hydrogen, methyl, phenyl or allyl, Z is —CH$_2$—, an o-, m- or p-dimethylphenylsilylene group having the structural formula (Z):

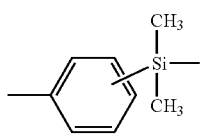

(Z)

which is bonded at the left end to the nitrogen atom and at the right end to the carbon atom, or a group having the structural formula (Z'):

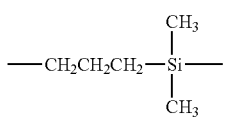

(Z')

which is bonded at the left end to the nitrogen atom and at the right end to the carbon atom, and h is 0 or 1.

Also preferably the composition has a viscosity of up to 2,000 Pa·s at 23° C.

In a second aspect, the invention provides a heat-conductive fluorinated cured product obtained by curing the heat-conductive fluorinated curable composition defined above.

The cured product should preferably have a thermal conductivity of at least 1.0 W/m·K at 25° C., and a hardness of up to 60 as measured by a type E Durometer according to JIS K6253-3.

Typically, the cured product is a heat transfer member to be interposed between a heat-generating part and a heat-dissipating part for transferring heat from the heat-generating part to the heat-dissipating part for heat dissipation.

In a third aspect, the invention provides an electric/electronic part comprising the cured product defined above. Most often, the electric/electronic part is used on automobiles.

Advantageous Effects of Invention

The heat-conductive fluorinated curable composition comprising components (A) to (E), and optionally components (F) and (G) has a good flow and cures into a cured product having oil resistance and heat conduction.

DESCRIPTION OF PREFERRED EMBODIMENTS

In the disclosure, the singular forms "a", "an" and "the" include plural referents unless the context clearly dictates otherwise. As used herein, the notation (Cn-Cm) means a group containing from n to m carbon atoms per group. The abbreviation Me stands for methyl, Et for ethyl, Ph for phenyl, Ph' for phenylene, ppm for parts by weight per million parts by weight, and GPC for gel permeation chromatography.

The invention provides a heat-conductive fluorinated curable composition comprising (A) an alkenyl-containing linear polyfluoro compound, (B) a fluorinated organohydrogensiloxane having a fluorinated organic group and SiH groups, (C) a platinum group metal based catalyst, (D) a heat-conductive filler, (E) a fluorinated organosilicon compound having a fluorinated organic group and an alkoxy group as essential components, and (F) a non-functional polyfluoro compound and (G) a polyfluoromonoalkenyl compound as optional components.

Component (A)

Component (A) is a linear polyfluoro compound containing at least two alkenyl groups in the molecule and having a perfluoropolyether structure in its backbone.

In component (A), the alkenyl group is preferably of 2 to 8 carbon atoms, more preferably 2 to 6 carbon atoms and has a CH$_2$=CH— structure at the end. Examples of the alkenyl group include vinyl, allyl, propenyl, isopropenyl, butenyl, and hexenyl, with vinyl and allyl being preferred.

The linear polyfluoro compound (A) has an alkenyl content of preferably 0.0050 to 0.300 mole/100 g, more preferably 0.0070 to 0.200 mole/100 g. An alkenyl content of at least 0.0050 mole/100 g leads to a sufficient degree of crosslinking to avoid undercure whereas an alkenyl content of up to 0.300 mole/100 g eliminates the risk of detracting from the mechanical properties of the cured product of the composition.

The perfluoropolyether structure in component (A) contains numerous repeating units: —C$_m$F$_{2m}$O— wherein in is an integer of 1 to 6, and typically has the general formula (3):

$$—(C_mF_{2m}O)_n \quad (3)$$

wherein m is an integer of 1 to 6 and n is an integer of 1 to 300, preferably 1 to 200.

Examples of the repeating units: —C$_m$F$_{2m}$O— are shown below.

—CF$_2$O—

—CF$_2$CF$_2$O—

—CF$_2$CF$_2$CF$_2$O—

—CF$_2$(CF$_3$)CF$_2$O—

—CF$_2$CF$_2$CF$_2$CF$_2$O—

—CF$_2$CF$_2$CF$_2$CF$_2$CF$_2$CF$_2$O—

—C(CF$_3$)$_2$O—

Of these, units of the formulae: —CF$_2$O—, —CF$_2$CF$_2$O—, —CF$_2$CF$_2$CF$_2$O— and —CF$_2$(CF$_3$)CF$_2$O— are preferred.

The perfluoropolyether structure in component (A) may consist of repeating units of one type or repeating units of two or more types.

Preferred examples of component (A) include linear polyfluoro compounds having the general formulae (4) and (5).

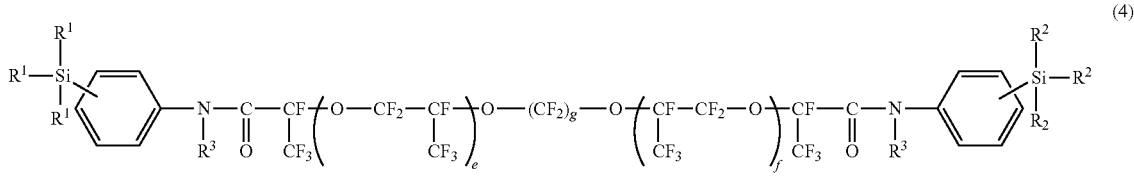

Herein $R^1$ and $R^2$ are each independently alkenyl or a substituted or unsubstituted monovalent hydrocarbon group free of aliphatic unsaturation, with the proviso that at least two of groups $R^1$ and $R^2$ are alkenyl. $R^3$ is each independently hydrogen or a substituted or unsubstituted monovalent hydrocarbon group, e and f each are an integer of 1 to 150, the sum of e+f is 2 to 300 on average, and g is an integer of 1 to 6.

The optionally substituted monovalent hydrocarbon group represented by $R^3$ is as exemplified for the optionally substituted monovalent hydrocarbon group free of aliphatic unsaturation as $R^1$ and $R^2$. Preferred as $R^3$ are hydrogen, methyl, and ethyl.

$R^4$ is an alkylene group of 1 to 6 carbon atoms, preferably 2 to 6 carbon atoms, examples of which include methylene, ethylene, propylene (trimethylene or methylethylene), buty-

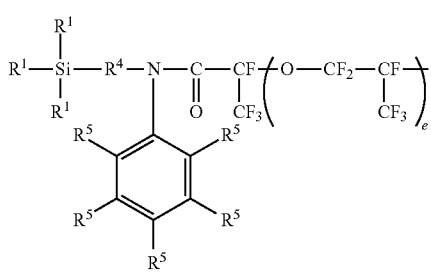 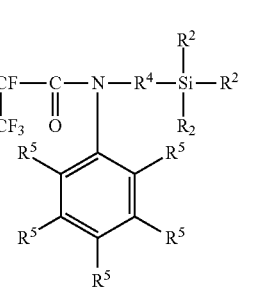

Herein $R^4$ is each independently a $C_1$-$C_6$ alkylene group, $R^5$ is each independently hydrogen or an optionally fluorinated $C_1$-$C_4$ alkyl group, and $R^1$, $R^2$, e, f and g are as defined above.

In formulae (4) and (5), $R^1$ and $R^2$ are independently an alkenyl group or an optionally substituted monovalent hydrocarbon group free of aliphatic unsaturation. Suitable alkenyl groups are as exemplified above. The optionally substituted monovalent hydrocarbon group free of aliphatic unsaturation preferably has 1 to 12 carbon atoms, more preferably 1 to 10 carbon atoms, examples include alkyl groups such as methyl, ethyl, propyl, butyl, hexyl cyclohexyl and octyl, aryl groups such as phenyl and tolyl, aralkyl groups such as benzyl and phenylethyl, and substituted forms of the foregoing groups in which at least one hydrogen atom (one or more or even all hydrogen atoms) is substituted by a halogen atom such as fluorine. More preferred as $R^1$ and $R^2$ are vinyl, allyl, methyl, and ethyl.

lene (tetramethylene or methylpropylene), and hexamethylene, with ethylene and propylene being preferred.

$R^5$ is each independently hydrogen or an optionally fluorinated $C_1$-$C_4$ alkyl group. Examples of the optionally fluorinated alkyl group include alkyl groups such as methyl, ethyl, propyl, and butyl, and substituted forms of the foregoing groups in which at least one hydrogen atom is substituted by fluorine, such as trifluoromethyl. Inter alia, hydrogen is preferred as $R^5$.

Each of e and f is an integer of 1 to 150, preferably 1 to 100, the sum of e+f is 2 to 300 on average, preferably 2 to 200 on average, and g is an integer of 1 to 6, preferably 1 to 4.

Examples of the linear polyfluoro compound having formula (4) are shown below.

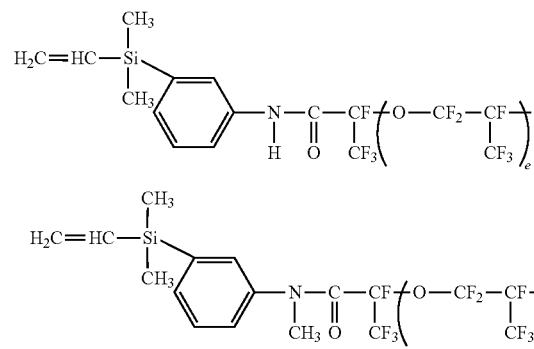 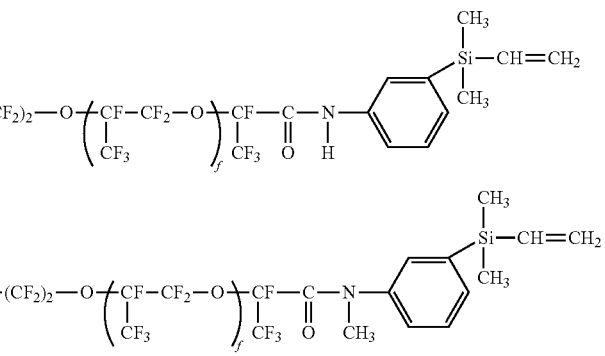

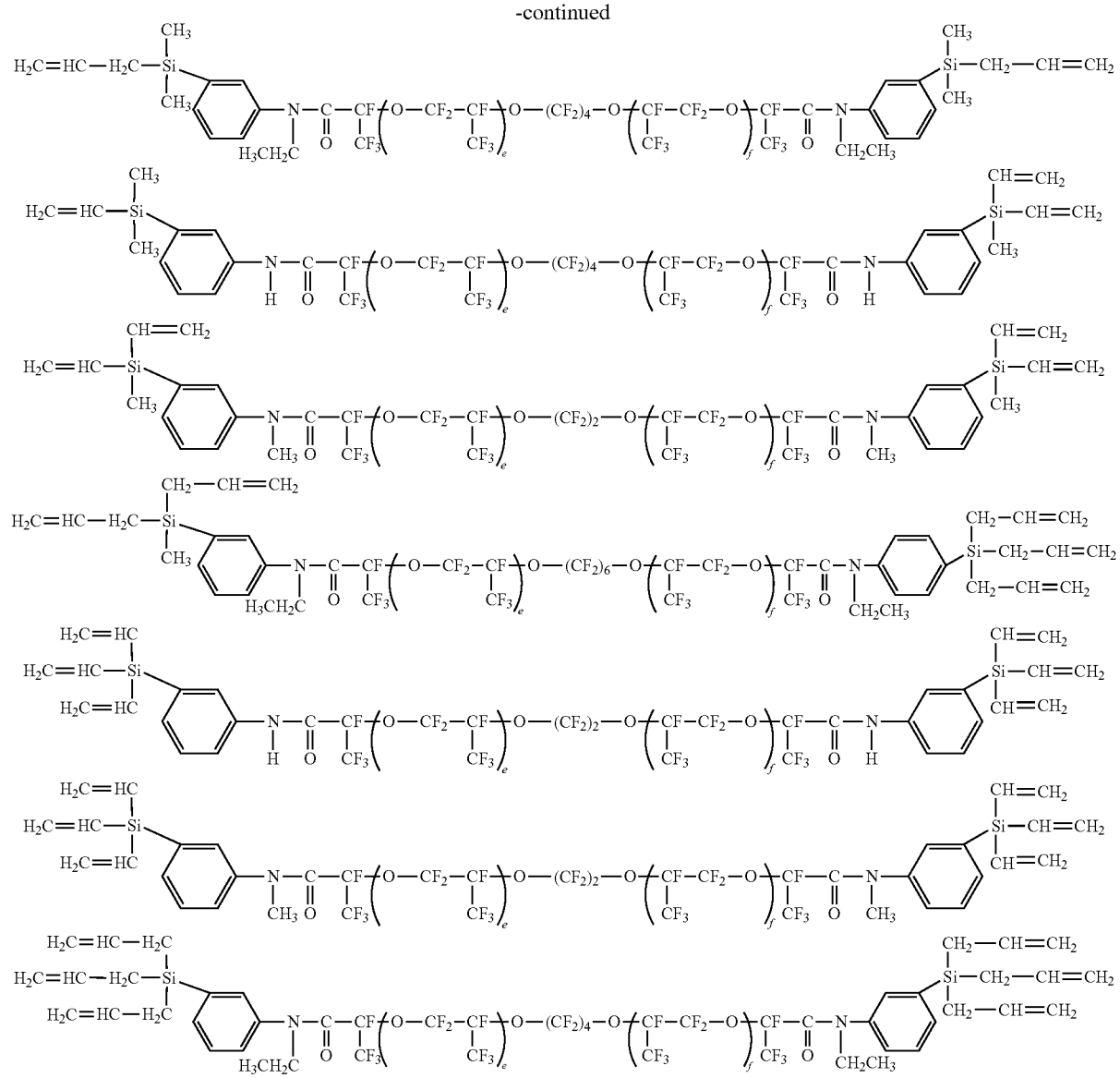
Herein e and f each are an integer of 1 to 150.
Examples of the linear polyfluoro compound having formula (5) are shown below.
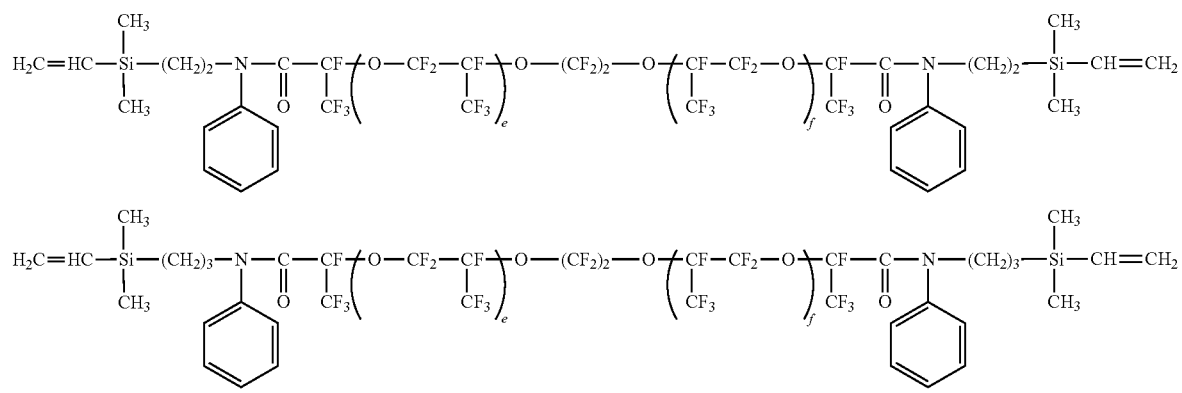

-continued

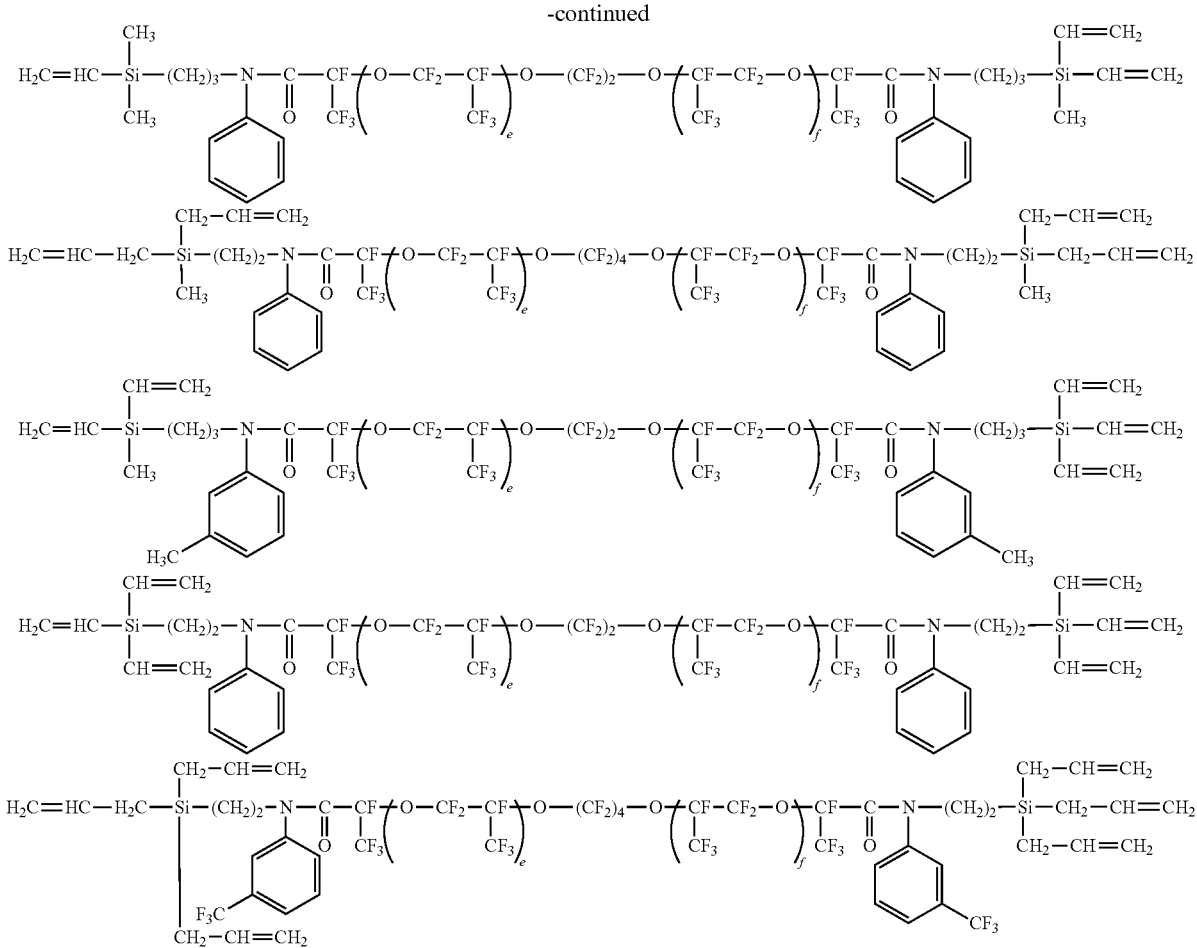

Herein e and f each are an integer of 1 to 100.

Notably the viscosity may be measured by a rotational viscometer, for example, BL, BH, BS or cone-plate type viscometer or rheometer. The linear polyfluoro compound having formula (4) or (5) preferably has a viscosity at 23° C. of 500 to 100,000 mPa·s, more preferably 1,000 to 50,000 mPa·s as measured according to JIS K7117-1. As long as the viscosity is 500 mPa·s or higher, the storage stability of the composition may not be worsened. As long as the viscosity is 100,000 mPa·s or lower, the composition may remain extensible. The linear polyfluoro compound has a degree of polymerization (or molecular weight) which is reflected by the number of repeating perfluorooxyalkylene units to construct the perfluoropolyether structure in the backbone. The degree of polymerization (or molecular weight) may be measured as a number average degree of polymerization (or number average molecular weight) by GPC versus polystyrene standards using a fluorochemical solvent as developing solvent.

The linear polyfluoro compound may be used alone or in admixture of two or more. Specifically, compounds of formula (4) or (5) may be used alone or in admixture of two or more, and compounds of formula (4) and (5) may be used in combination.

Component (B)

Component (B) is a fluorinated organohydrogensiloxane which serves as a crosslinker for component (A). The fluorinated organohydrogensiloxane (B) has a monovalent perfluoroalkyl, monovalent perfluorooxyalkyl, divalent perfluoroalkylene or divalent perfluorooxyalkylene group, at least two silicon-bonded hydrogen atoms (i.e., SiH or hydrosilyl groups) per molecule and is free of a silicon-bonded alkoxy group in the molecule, preferably has at least one mono- or divalent fluorinated organic group (listed above) and at least two SiH groups, and is free of another functional group different from SiH, such as epoxy, alkoxy and cyclic carboxylic anhydride residue. It is to be noted that the "other functional group" is exclusive of divalent polar groups (or polar structures) such as an ether oxygen atom, amide bond, carbonyl bond and ester bond which may be contained in a divalent linker between the perfluoroalkyl, perfluorooxyalkyl, perfluoroalkylene or perfluorooxyalkylene group and a silicon atom in the polysiloxane.

The monovalent perfluoroalkyl, monovalent perfluorooxyalkyl, divalent perfluoroalkylene and divalent perfluorooxyalkylene groups are introduced for compatibility with and dispersion in component (A), uniformity after curing, and other purposes.

Suitable monovalent perfluoroalkyl and monovalent perfluorooxyalkyl groups include groups having the general formula (9):

$$C_kF_{2k+1}— \tag{9}$$

wherein k is an integer of 1 to 10, preferably 3 to 7, and groups having the general formula (10):

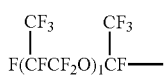

(10)

wherein l is an integer of 1 to 50, preferably 2 to 30.

Suitable divalent perfluoroalkylene and divalent perfluorooxyalkylene groups include groups having the general formula (11):

 (11)

wherein p is an integer of 1 to 20, preferably 2 to 10, groups having the general formula (12):

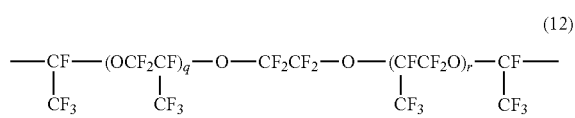 (12)

wherein q and r each are an integer of at least 1, preferably 1 to 100, and the sum of q+r is 2 to 200, preferably 2 to 100 on average, and groups having the general formula (13):

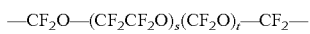 (13)

wherein s and t each are an integer of 1 to 50, preferably 1 to 30, and individual repeating units may be randomly arranged.

Preferably the perfluoroalkyl, perfluorooxyalkyl, perfluoroalkylene or perfluorooxyalkylene group is linked to a silicon atom in the polysiloxane by a divalent linker. The preferred divalent linker is a substituted or unsubstituted divalent hydrocarbon group of 2 to 12 carbon atoms, more preferably 2 to 8 carbon atoms which may contain an oxygen, nitrogen or silicon atom, examples of which include alkylene groups, arylene groups and combinations thereof, in which one or more structures selected from an ether oxygen atom, amide bond, carbonyl bond, ester bond, and diorganosilylene (e.g., dimethylsilylene) may intervene. Exemplary of the divalent linker are those of 2 to 12 carbon atoms, including —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)-CO—, —CH$_2$CH$_2$CH$_2$—N (CH$_3$)—CO—, —CH$_2$CH$_2$CH$_2$—N(CH$_2$CH$_3$)—CO—, —CH$_2$CH$_2$CH$_2$—N(CH(CH$_3$)$_2$)—CO—, —CH$_2$CH$_2$CH$_2$—O—CO—, —CH$_2$CH$_2$—Si(CH$_3$)$_2$-Ph'-N (CH$_3$)—CO—, and —CH$_2$CH$_2$CH$_2$—Si(CH$_3$)$_2$-Ph'-N (CH$_3$)—CO—.

In addition to the mono- or divalent fluorinated organic group (listed above) and silicon-bonded hydrogen atom, the fluorinated organohydrogensiloxane (B) may contain another monovalent substituent group bonded to a silicon atom. Suitable substituent groups are substituted or unsubstituted alkyl and aryl groups of 1 to 20 carbon atoms, preferably 1 to 12 carbon atoms including alkyl groups such as methyl, ethyl, propyl, butyl, hexyl, cyclohexyl, octyl and decyl, aryl groups such as phenyl, tolyl and naphthyl, and substituted forms of the foregoing groups in which some or all hydrogen atoms are substituted by halogen atoms (e.g., chlorine), cyano groups or the like, such as chloromethyl, chloropropyl, and cyanoethyl. Of these, methyl is preferred.

The polysiloxane structure of the fluorinated organohydrogensiloxane (B) may be cyclic, chain-like, three-dimensional network or combinations thereof. Although the number of silicon atoms in the fluorinated organohydrogensiloxane is not particularly limited, it is generally from about 2 to about 60, preferably from about 3 to about 30, and more preferably about 4 to about 30.

Component (B) has at least two SiH groups in the molecule. The content of SiH groups is preferably 0.0100 to 1.00 mole/100 g, more preferably 0.0200 to 0.900 mole/100 g.

Illustrative examples of component (B) include compounds having the general formulae (14) to (20).

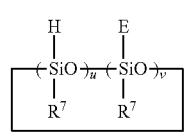 (14)

Herein E is independently a monovalent perfluoroalkyl or monovalent perfluorooxyalkyl group which is bonded to the silicon atom in the polysiloxane via a divalent hydrocarbon group which may contain oxygen, nitrogen and silicon atoms. $R^7$ is independently a substituted or unsubstituted alkyl or aryl group of 1 to 20 carbon atoms, preferably 1 to 12 carbon atoms, u is an integer of 2 to 6, preferably 3 to 6, v is an integer of 1 to 4, preferably 1 to 3, and the sum of u+v is an integer of 4 to 10, preferably 4 to 9.

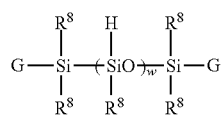 (15)

Herein G is independently like E, $R^8$ is independently like $R^7$, and w is an integer of 2 to 50, preferably 3 to 30.

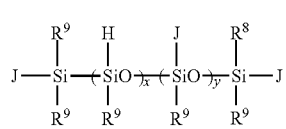 (16)

Herein J is independently like E, $R^9$ is independently like $R^7$, x is an integer of 2 to 50, preferably 3 to 30, y is an integer of 1 to 40, preferably 1 to 20, and the sum of x+y is an integer of 4 to 60, preferably 4 to 50.

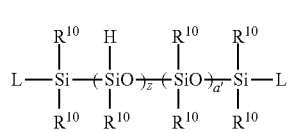 (17)

Herein L is independently like E, $R^{10}$ is independently like $R^7$, z is an integer of 2 to 50, preferably 3 to 30, a' is an integer of 1 to 40, preferably 1 to 20, and the sum of z+a' is an integer of 4 to 60, preferably 4 to 50.

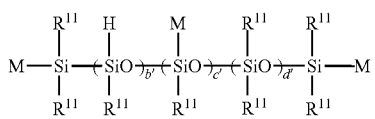
(18)

Herein M is independently like E, $R^{11}$ is independently like $R^7$, b' is an integer of 2 to 50, preferably 3 to 30, c' is an integer of 1 to 40, preferably 1 to 20, d' is an integer of 1 to 40, preferably 1 to 20, and the sum of b'+c'+d' is an integer of 5 to 60, preferably 5 to 50.

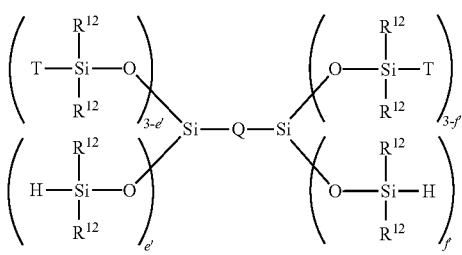
(19)

Herein Q is an oxygen atom, an alkylene group, or a divalent perfluoroalkylene or divalent perfluorooxyalkylene group which is bonded to the silicon atom via a divalent hydrocarbon group optionally containing an oxygen or nitrogen atom. Typical of the perfluoroalkylene and perfluorooxyalkylene groups are groups having the general formulae (11) to (13). T is independently like E, $R^{12}$ is independently like $R^7$, e' is 0 or an integer of 1 to 3, f' is 0 or an integer of 1 to 3, and the sum of e'+f' is an integer of 2 to 6, preferably 3 to 5.

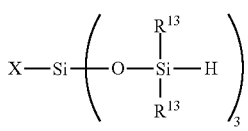
(20)

Herein X is like E, and $R^{13}$ is independently like $R^7$.

Illustrative examples of component (B) include the following compounds.

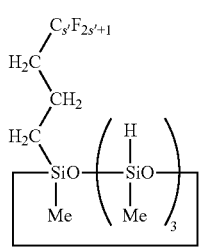

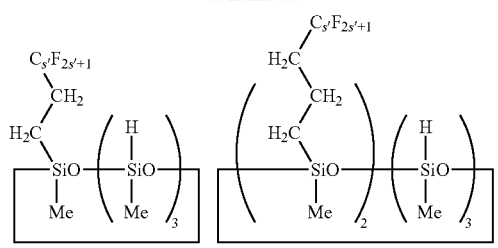

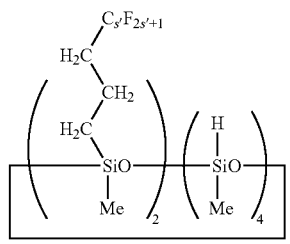

Herein s' is an integer of 1 to 10.

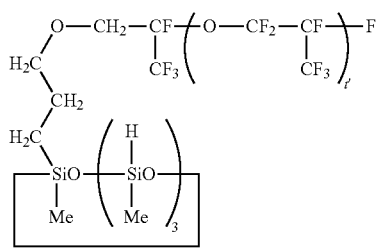

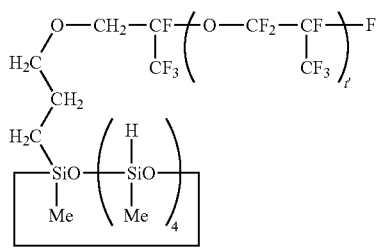

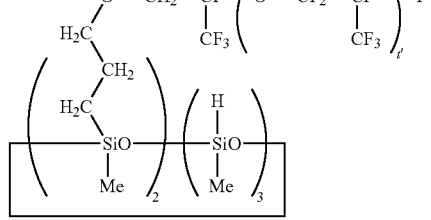

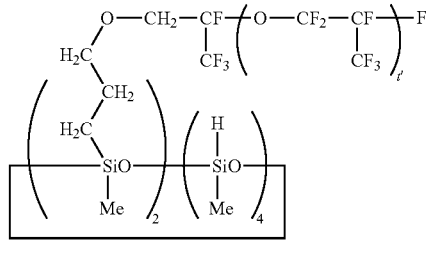

Herein t' is an integer of 1 to 50.

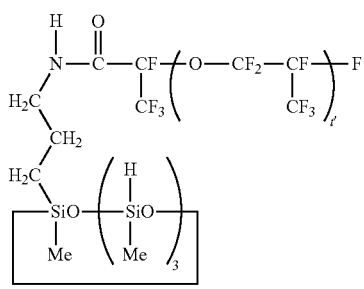
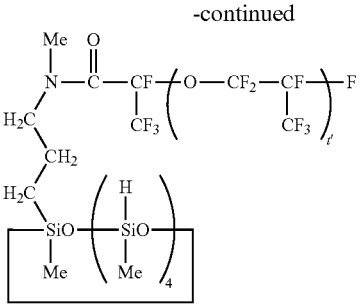
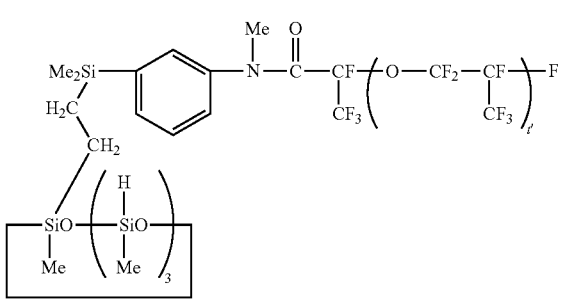
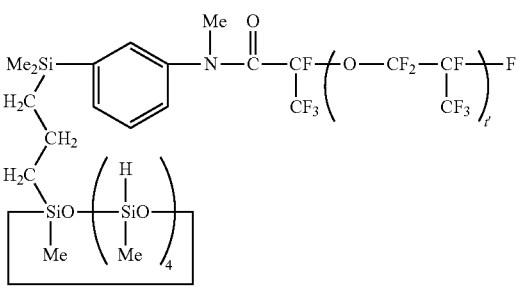
Herein t' is an integer of 1 to 50.
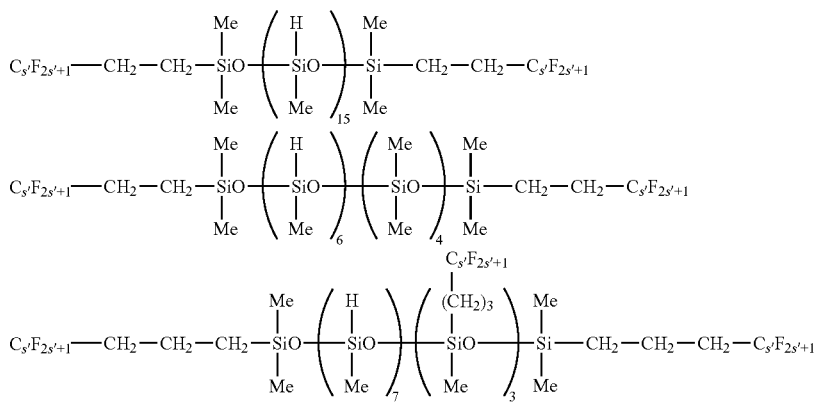
Herein s' is an integer of 1 to 10.
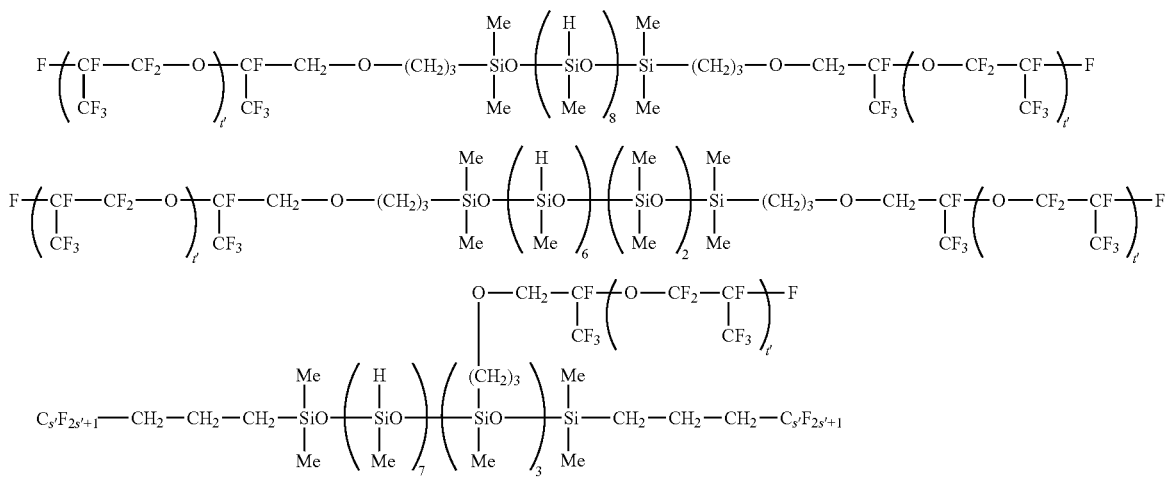

-continued
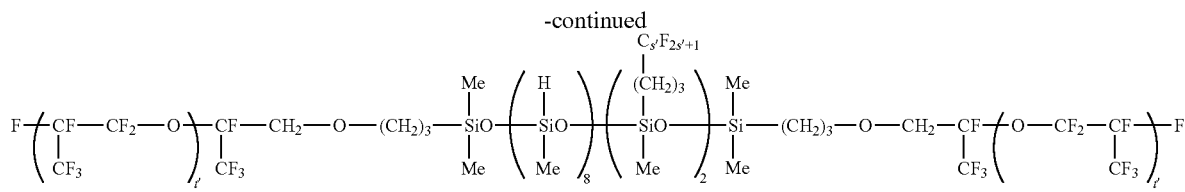
Herein s' is an integer of 1 to 10 and t' is an integer of 1 to 50.
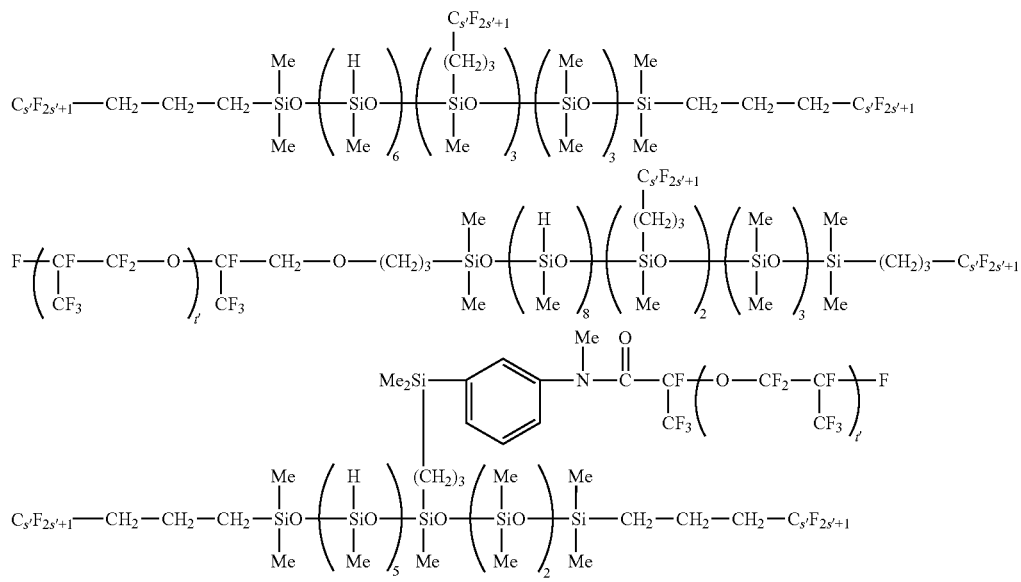
Herein s' is an integer of 1 to 10 and t' is an integer of 1 to 50.
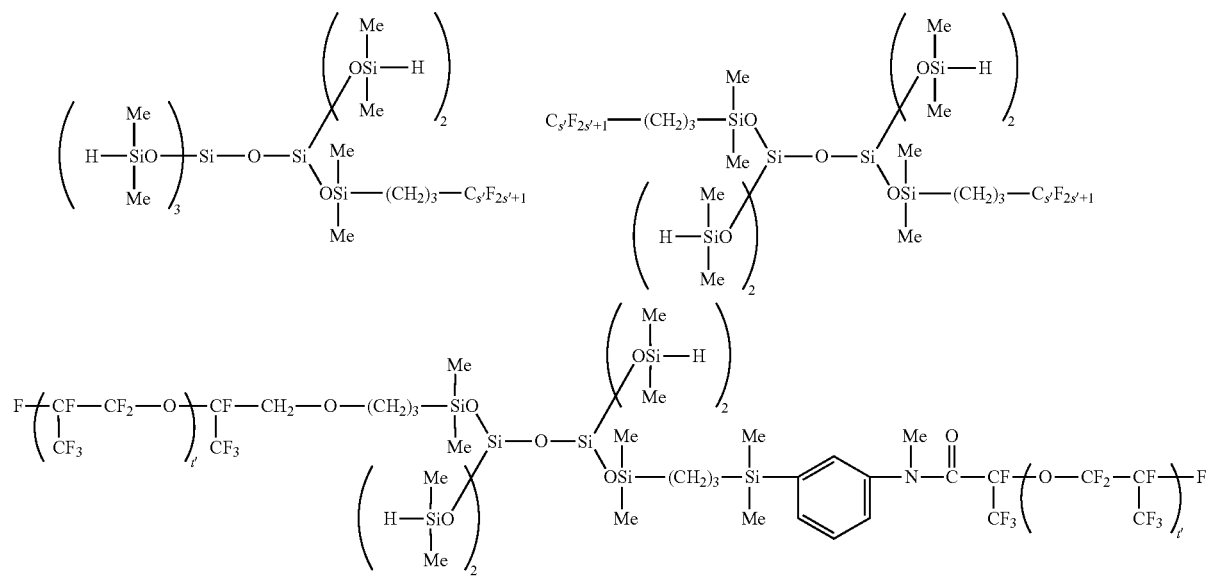
Herein s' is an integer of 1 to 10 and t' is an integer of 1 to 50.

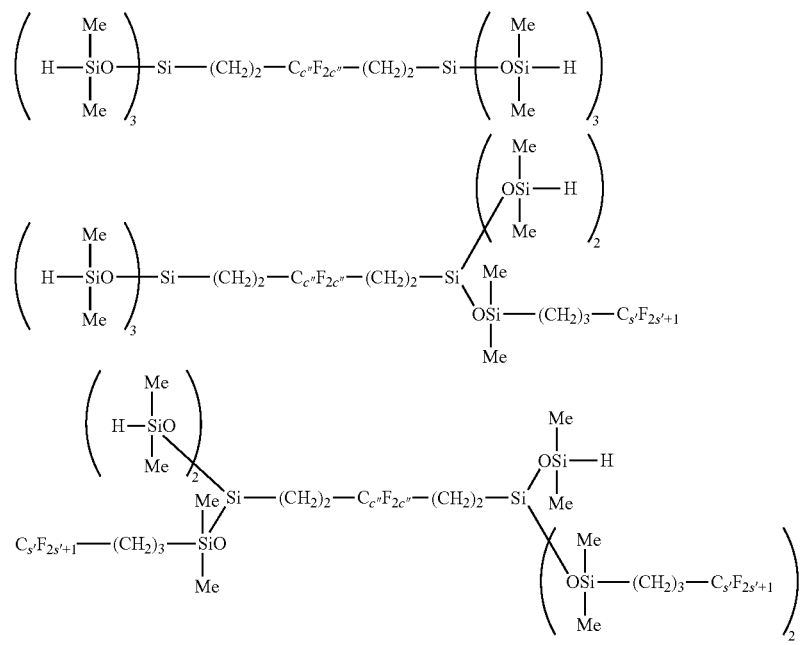
Herein s' is an integer of 1 to 10 and c" is an integer of 1 to 20.
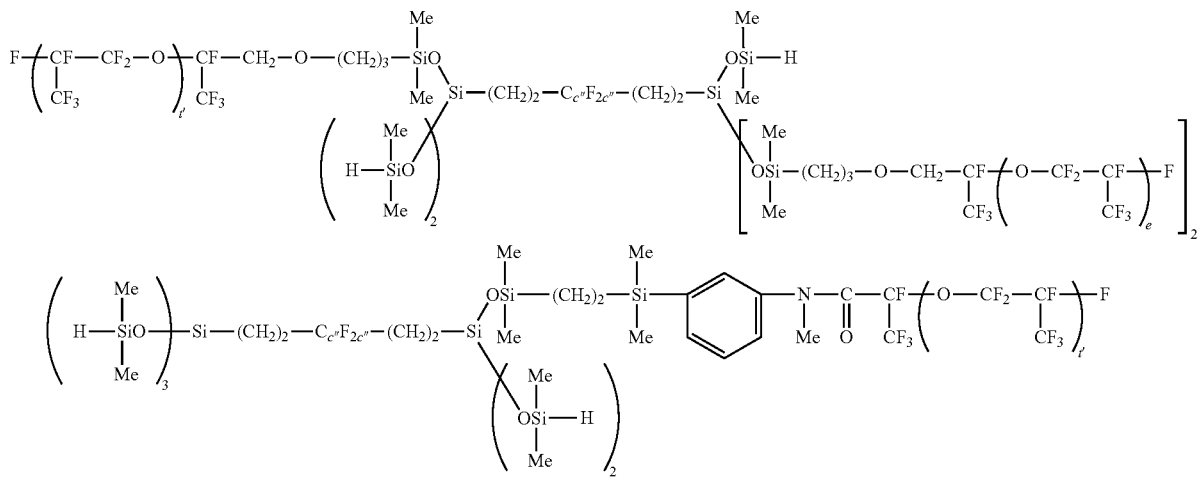
Herein t' is an integer of 1 to 50 and c" is an integer of 1 to 20.
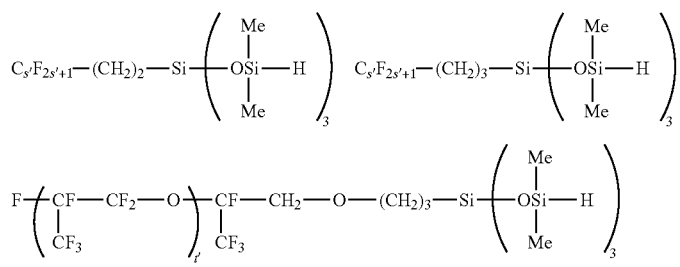

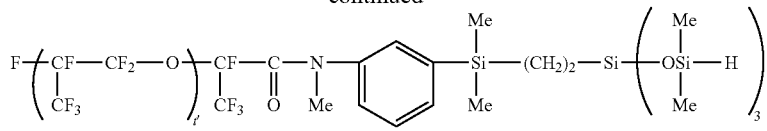
Herein s' is an integer of 1 to 10 and t' is an integer of 1 to 50.
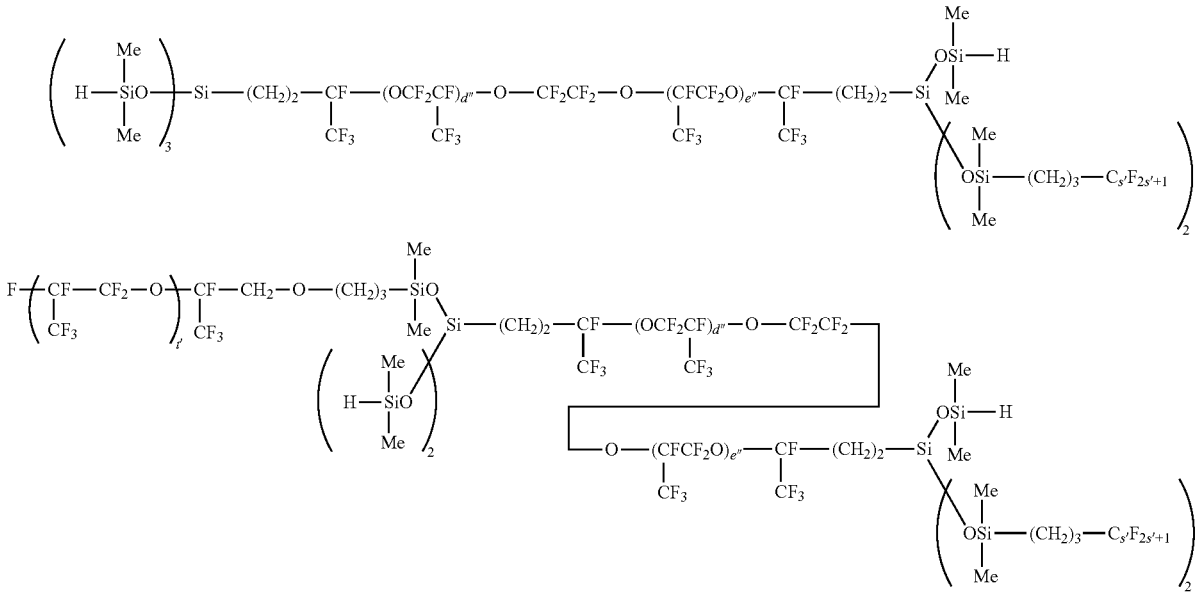
Herein s' is an integer of 1 to 10, t' is an integer of 1 to 50, d" and e" each are an integer of 1 to 100, and the sum of d"+e" is an integer of 2 to 200.
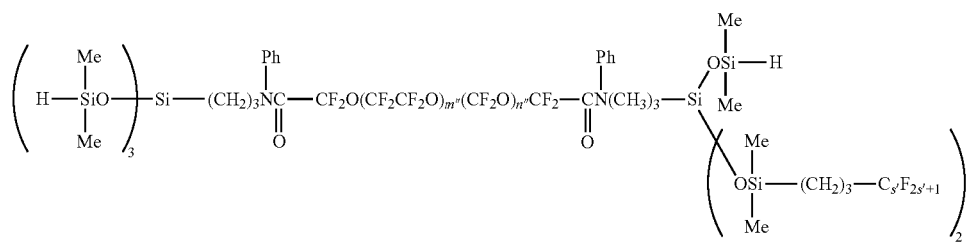
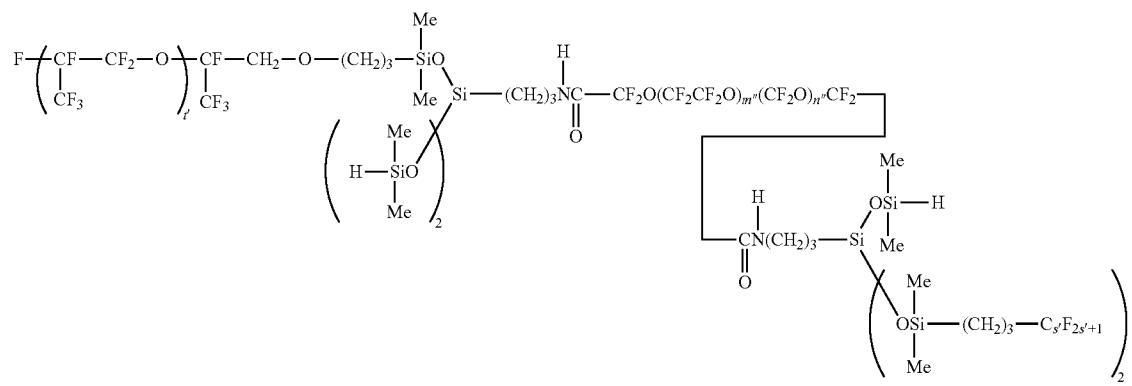

Herein s' is an integer of 1 to 10, t' is an integer of 1 to 50, and m" and n" each are an integer of 1 to 50.

These compounds may be used alone or in admixture of two or more as component (B). Component (B) is added in such an amount as to provide 0.50 to 3.0 moles, and preferably 0.60 to 2.0 moles of SiH groups in component (B) per mole of alkenyl groups in the composition. Less than 0.50 mole of SiH groups may lead to an insufficient degree of crosslinking whereas more than 3.0 moles of SiH groups may detract from storage stability or result in a cured product with insufficient heat resistance.

Component (C)

Component (C) is a platinum group metal based catalyst serving as a hydrosilylation reaction catalyst. The hydrosilylation catalyst promotes addition reaction between alkenyl groups in the composition, especially alkenyl groups in component (A) and SiH groups in the composition, especially SiH groups in component (B). Typical hydrosilylation catalysts are noble metals and compounds thereof, and thus expensive. Of these, platinum or platinum compounds are often used because they are readily available.

Exemplary platinum compounds include chloroplatinic acid and complexes of chloroplatinic acid with olefins (e.g., ethylene), alcohols and vinyl siloxanes, and metallic platinum on supports such as silica, alumina and carbon. Known platinum group metal catalysts other than the platinum compounds include rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$ and $Pd(PPh_3)_4$.

When these catalysts are solid, they may be used in a solid, state. However, in the preferred procedure, chloroplatinic acid or a complex thereof is previously dissolved in a suitable solvent such as toluene or ethanol. Since the resulting solution is compatible with the linear polyfluoro compound (A), a more uniform cured product is obtainable.

The hydrosilylation reaction catalyst (C) may be used in a catalytic amount. The amount of catalyst used may be determined as appropriate depending on the desired cure rate. Typically, the catalyst is used in an amount to provide 0.1 to 2,000 ppm, preferably 0.1 to 500 ppm, and more preferably 0.5 to 200 ppm of platinum group metal based on the weight of component (A).

Component (D)

Component (D) is a heat-conductive filler which is used for rendering the composition heat conductive. Examples of the filler include metals such as aluminum, non-magnetic copper, nickel, carbon black and metallic silicon, metal oxides such as alumina, magnesium oxide, beryllium oxide, chromium oxide and titanium oxide, metal nitrides such as boron nitride, silicon nitride and aluminum nitride, metal hydroxides such as aluminum hydroxide, metal carbides such as boron carbide, titanium carbide and silicon carbide, soft magnetic alloys such as Fe—Si alloys, Fe—Al alloys, Fe—Al—Si alloys, Fe—Si—Cr alloys, Fe—Ni alloys, Fe—Ni—Co alloys, Fe—Al—Si—Cr alloys, Fe—Si—B alloys and Fe—Si—Co—B alloys, ferrites such as Mn—Zn ferrite, Mn—Mg—Zn ferrite, Mg—Cu—Zn ferrite, Ni—Zn ferrite, Ni—Cu—Zn ferrite and Cu—Zn ferrite, and mixtures of two or more thereof.

Where electrical insulation is required, metal oxides, metal nitrides, metal hydroxides, and metal carbides are preferred as component (D). Of these, metal oxides are more preferred, with alumina being most preferred.

Alumina as component (D) is preferably irregular alumina or spherical alumina because thermal conductivity is advantageously improved. The irregular alumina and spherical alumina may be used alone or in admixture.

The irregular shape alumina preferably has an average particle size of 0.2 to 0.5 μm, more preferably 0.4 to 4.0 μm. As long as the average particle size is at least 0.2 μm, it may be avoided that the composition becomes too viscous to work or shape. As long as the average particle size is up to 5.0 μm, it may be avoided that the electrical insulating properties of a cured product of the composition are adversely affected. The irregular alumina may be used alone or as a mixture of two or more types. The irregular alumina is commercially available. As used herein, the average particle size is a volume basis accumulative average particle size $D_{50}$ (or median diameter) as measured by a particle size analyzer Microtrac MT3300EX (Nikkiso Co., Ltd.).

The spherical alumina preferably has an average particle size of 5.0 to 100 μm, more preferably 7.0 to 90 μm. As long as the average particle size is at least 5.0 μm, it may be avoided that the composition becomes too viscous to work or shape. As long as the average particle size is up to 100 μm, the spherical alumina may be uniformly dispersed in the composition. The spherical alumina may be used alone or as a mixture of two or more types. The spherical alumina is commercially available. The average particle size is measured as defined above for the irregular alumina.

Component (D) is used in an amount of 100 to 4,000 parts by weight, preferably 200 to 3,500 parts by weight per 100 parts by weight of component (A). If component (D) is less than 100 parts by weight, the composition may cure into a cured product having insufficient thermal conductivity. If component (D) is more than 4,000 parts by weight, it may not be uniformly dispersed in the composition.

Component (E)

Component (E) is a fluorinated organosilicon compound which serves as a surface treating agent and/or dispersant (or wetter) for component (D). The fluorinated organosilicon compound (E) has at least one monovalent perfluoroalkyl or monovalent perfluorooxyalkyl group, at least one silicon-bonded alkoxy group in the molecule and is free of a silicon-bonded hydrogen atom (i.e., SiH group) in the molecule, preferably has at least one monovalent fluorinated organic group (defined above) and at least one silicon-bonded alkoxy group, and is free of another functional group such as a SiH group, epoxy group or cyclic carboxylic anhydride residue. During preparation of the composition, component (D) is hydrophobic treated with component (E) whereby component (D) becomes more wettable to component (A). This allows a larger amount of component (D) to be added to component (A). By the treatment, component (D) is also improved in dispersion in the composition. It is to be noted that the "other functional group" is exclusive of divalent polar groups (or polar structures) such as an ether oxygen atom, amide bond, carbonyl bond and ester bond which may be contained in a divalent linker between the perfluoroalkyl or perfluorooxyalkyl group and a silicon atom.

The monovalent perfluoroalkyl and monovalent perfluorooxyalkyl groups are introduced from such aspects as compatibility with and dispersion in component (A).

Suitable monovalent perfluoroalkyl and monovalent perfluorooxyalkyl groups include groups having the general formula (9):

$$C_kF_{2k+1}— \qquad (9)$$

wherein k is an integer of 1 to 10, preferably 3 to 7, and groups having the general formula (10):

wherein l is an integer of 1 to 50, preferably 2 to 30.

Preferably the monovalent perfluoroalkyl or monovalent perfluorooxyalkyl group is linked to a silicon atom having alkoxy directly bonded thereto, via a divalent linker or hydrocarbon group which may contain carbon, silicon, oxygen and nitrogen atoms. The preferred divalent hydrocarbon groups include alkylene groups, arylene groups and combinations thereof, in which one or more structures selected from an ether oxygen atom, amide bond, carbonyl bond, ester bond, and diorganosilylene (e.g., dimethylsilylene) may intervene. Exemplary of the divalent hydrocarbon group are those of 2 to 12 carbon atoms, including —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)-CO—, —CH$_2$CH$_2$CH$_2$—N(CH$_3$)—CO—, —CH$_2$CH$_2$CH$_2$—N(CH$_2$CH$_3$)—CO—, —CH$_2$CH$_2$CH$_2$—N(CH(CH$_3$)$_2$)—CO—, —CH$_2$CH$_2$CH$_2$—O—CO—, —CH$_2$CH$_2$CH$_2$—Si(CH$_3$)$_2$—O—Si(CH$_3$)$_2$—CH$_2$CH$_2$CH$_2$—, —CH$_2$OCH$_2$CH$_2$CH$_2$—Si(CH$_3$)$_2$—O—Si(CHO$_2$—CH$_2$CH$_2$—, —CO—N(CH$_3$)-Ph'-Si(CH$_3$)$_2$—CH$_2$CH$_2$—Si(CH$_3$)$_2$—O—Si(CH$_3$)$_2$—CH$_2$CH$_2$—, —CO—NH-Ph'-[Si(CH$_3$)$_2$—CH$_2$CH$_2$]$_3$—CH$_2$—, and —CO—N(CH$_3$)-Ph'-[Si(CH$_3$)$_2$—CH$_2$CH$_2$]$_3$—.

Component (E) is preferably a fluorinated organosilicon compound having the general formula (6).

$$D_{g'}R^{14}{}_{h'}Si(OR^6)_{4-g'-h'} \quad (6)$$

Herein D is each independently a monovalent perfluoroalkyl or monovalent perfluorooxyalkyl group which is bonded to the silicon atom having alkoxy directly bonded thereto, via a divalent hydrocarbon group which may contain carbon, silicon, oxygen and nitrogen atoms, as illustrated above. $R^6$ is each independently an alkyl group of 1 to 6 carbon atoms, preferably 1 to 4 carbon atoms, with methyl and ethyl being preferred. $R^{14}$ is each independently a substituted or unsubstituted monovalent hydrocarbon group as exemplified for the substituted or unsubstituted monovalent hydrocarbon group free of aliphatic unsaturation represented by $R^1$ and $R^2$, g' is an integer of 1 to 3, h' is an integer of 0 to 2, and the sum of g'+h' is an integer of 1 to 3.

Preferably component (E) has a heat loss (weight loss on heating) of up to 50.0% by weight, more preferably up to 40.0% by weight upon heating at 105° C. for 3 hours. As long as the weight loss is up to 50.0% by weight, it may be avoided that a cured product of the composition is bubbled.

Illustrative examples of component (E) include the following compounds.

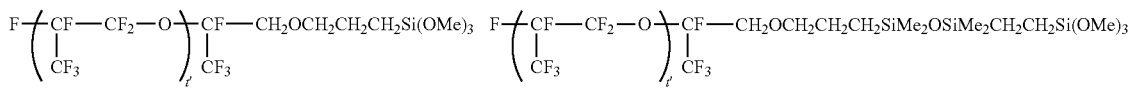

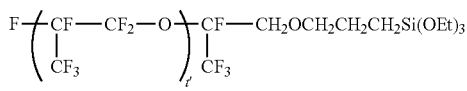

Herein q' is an integer of 1 to 10 and r' is an integer of 1 to 50.

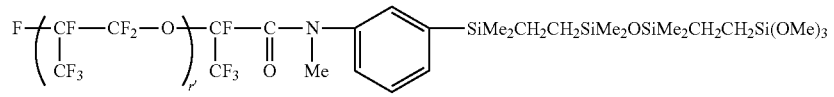

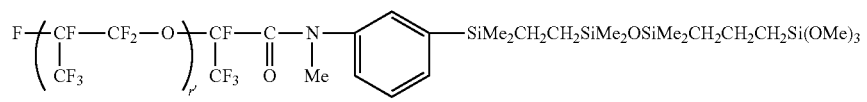

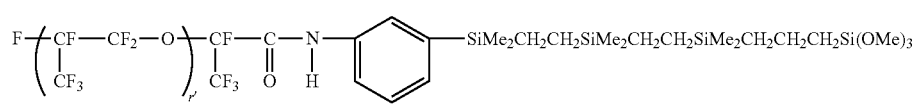

-continued

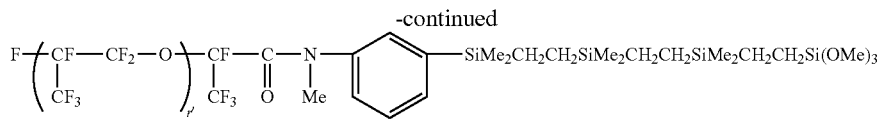

Herein r' is an integer of 1 to 50.

Component (E) may be used alone or in admixture of two or more. Component (E) is added in an amount of 0.01 to 300 parts by weight, preferably 0.10 to 250 parts by weight per 100 parts by weight of component (A). With less than 0.01 part by weight of component (E), the surface treatment of component (D) may be insufficient. More than 300 parts by weight of component (E) may detract from the mechanical strength of a cured product of the composition.

Component (F)

Component (F) may be added as an optional component to the heat-conductive fluorinated curable composition. Component (F) is at least one non-functional polyfluoro compound (i.e., polyfluoro compound which does not contain a functional group capable of participating in at least hydrosilylation addition reaction, such as alkenyl or SiH group, in the molecule) selected from compounds having the general formulae (1) and (2).

$$F—(CF_2CF_2CF_2O)_a\text{-}A \quad (1)$$

Herein A is a group: $—C_bF_{2b+1}$ wherein b is an integer of 1 to 3, and a is an integer of 1 to 500, preferably 2 to 300.

$$A\text{-}\{(OCF(CF_3)CF_2)_c—(OCF_2CF_2)_d—(OCF_2)_{u'}\}— O\text{-}A \quad (2)$$

Herein A is as defined above, c and d each are an integer of 0 to 300, preferably 0 to 150, excluding that both c and d are 0, u' is an integer of 1 to 300, preferably 1 to 150, and individual repeating units may be randomly arranged.

Component (F) may impart an appropriate fluidity to the composition and also impart an adequate hardness to the cured product of the composition.

Illustrative examples of component (F) include the following compounds.

$$F—(CF_2CF_2CF_2O)_{i'}—CF_2CF_3$$

Herein i' is an integer of 1 to 200.

$$CF_3—\{(OCF(CF_3)CF_2)_{j'}—(OCF_2)_{k'}\}—O—CF_3$$

Herein j' is an integer of 1 to 200, k' is an integer of 1 to 200, and individual repeating units may be randomly arranged.

$$CF_3—\{(OCF_2CF_2)_{v'}—(OCF_2)_{w'}\}—O—CF_3$$

Herein v' is an integer of 1 to 200, is an integer of 1 to 200, and individual repeating units may be randomly arranged.

Component (F) may be used alone or in admixture of two or more. When used, component (F) is preferably added to the composition in an amount of 0.1 to 300 parts by weight, more preferably 0.5 to 250 parts by weight per 100 parts by weight of component (A). As long as component (F) is 0.1 part by weight or more, it may not be insufficient to impart an appropriate fluidity to the composition and an adequate hardness to the cured product of the composition. As long as component (F) is 300 parts by weight or less, bleeding of component (F) from the cured product of the composition may be avoided.

Component (G)

Further, component (G) may be added to the heat-conductive fluorinated curable composition as an optional component. Component (G) is a polyfluoromonoalkenyl compound containing one alkenyl group in the molecule and having a perfluoropolyether structure in its backbone. Component (G) may impart an appropriate fluidity to the composition and also impart an adequate hardness to the cured product of the composition.

Component (G) is preferably a polyfluoromonoalkenyl compound having the general formula (7).

$$Rf—(Y)_h—CH=CH_2 \quad (7)$$

Herein Rf is a group having the following formula (8):

$$F—[CF(CF_3)CF_2O]_i—C_jF_{2j}— \quad (8)$$

wherein i is an integer of 1 to 200, preferably 1 to 150 and j is an integer of 1 to 3; Y is $—CH_2—$, $—OCH_2—$, $—CH_2OCH_2—$ or $—CO—NR^{15}—Z—$, which is bonded at the left end to Rf and at the right end to the carbon atom, wherein $R^{15}$ is hydrogen, methyl, phenyl or allyl, and Z is $—CH_2—$, an o-, m- or p-dimethylphenylsilylene group having the structural formula (Z):

which is bonded at the left end to the nitrogen atom and at the right end to the carbon atom, or a group having the structural formula (Z'):

which is bonded at the left end to the nitrogen atom and at the right end to the carbon atom; and h is 0 or 1.

Illustrative examples of component (G) include the following compounds.

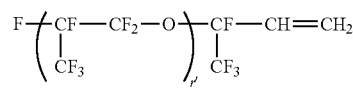

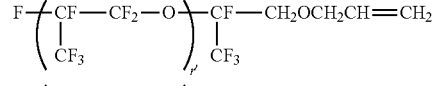

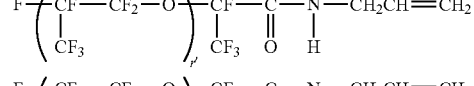

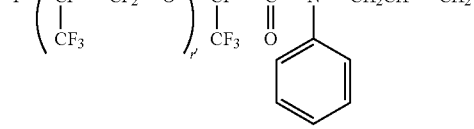

-continued

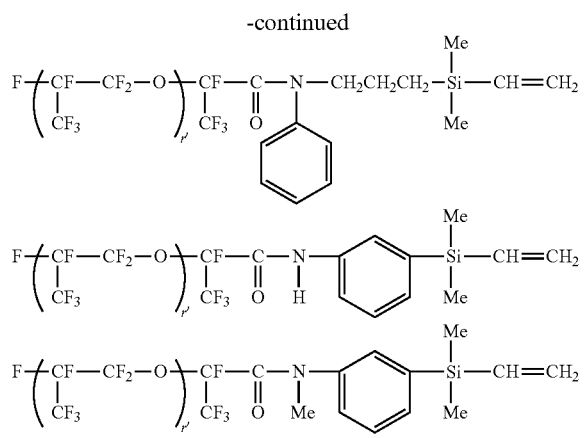

Herein l' is an integer of 1 to 200.

Component (G) may be used alone or in admixture of two or more. When used, component (G) is preferably added to the composition in an amount of 0.1 to 100 parts by weight, more preferably 0.5 to 80 parts by weight per 100 parts by weight of component (A). As long as component (G) is 0.1 part by weight or more, it may not be insufficient to impart an appropriate fluidity to the composition and an adequate hardness to the cured product of the composition. As long as component (G) is 100 parts by weight or less, it does not detract from the mechanical strength of a cured product of the composition.

Other Components

In addition to components (A) to (G) defined above, the heat-conductive fluorinated curable composition may optionally contain various additives such as an inorganic filler (other than component (D)) and addition reaction inhibitor for enhancing its practical utility. These additives may be used in any desired amounts.

Examples of the inorganic filler other than component (D) include silica based reinforcing fillers including dry silica such as fumed silica, wet silica such as precipitated silica, fused silica such as spherical silica, silica powder such as sol-gel silica and silica aerogel, the foregoing silica powder which is surface treated with an agent selected from organochlorosilanes, organodisilazanes, and cyclic organopolysilazanes, and the surface treated silica which is re-treated with an organosilane or organosiloxane having a monovalent perfluoroalkyl group of formula (9) or a monovalent perfluorooxyalkyl group of formula (10); reinforcing or semi-reinforcing fillers including quartz powder such as crystalline silica, fused quartz powder, diatomaceous earth and calcium carbonate; and inorganic pigments such as titanium oxide, iron oxide, carbon black and cobalt aluminate.

Examples of the hydrosilylation (addition) reaction inhibitor include acetylene alcohols such as 1-ethynyl-1-hydroxycyclohexane, 3-methyl-1-butyn-3-ol, 3,5-dimethyl-1-hexyn-3-ol, 3-methyl-1-pentyn-3-ol and phenylbutynol, the reaction products of these acetylene alcohols with a chlorosilane having a monovalent perfluoroalkyl group of formula (9) or a monovalent perfluorooxyalkyl group of formula (10), 3-methyl-3-penten-1-yne, 3,5-dimethyl-3-hexen-1-yne, triallyl isocyanurate, polyvinylsiloxane, and organophosphorus compounds. The addition of the inhibitor helps to maintain an appropriate curing reactivity and shelf stability.

The method for producing the heat-conductive fluorinated curable composition is not particularly limited. Typically, the composition may be prepared by mixing the above components (A) to (G) and other optional components until uniform. For efficient surface treatment of component (D) with component (E), the preferred method is by premixing components (A), (D), and (E), optionally components (F) and (G), adding and kneading component (C), and finally adding and kneading component (B). Other components may be compounded at a suitable time. Components (D) and (E) may be added all at once or in divided portions. The device for the preparation of the composition may be a mixer such as a planetary mixer, Ross mixer or Hobart mixer or, if desired, a kneading device such as a kneader or three-roll mill.

The heat-conductive fluorinated curable composition may be formulated as a one-pack type composition by mixing all components (A) to (G) and optional components. Alternatively, the composition may be formulated as a two-pack type composition wherein two parts are mixed together prior to use.

The heat-conductive fluorinated curable composition preferably has a viscosity at 23° C. of up to 2,000 Pa·s, more preferably 10.0 Pa·s to 1,800 Pa·s. With a viscosity of 2,000 Pa·s or less, the composition may not be too viscous to work or shape. Notably, the viscosity is measured by a rotational rheometer HAAKE® RotoVisco® 1 (Thermo Fisher Scientific Inc.).

The heat-conductive fluorinated curable composition may be heat cured into a cured product having good oil resistance and heat conduction. Although the curing temperature is not particularly limited, it typically ranges from 20° C. to 200° C., preferably from 40° C. to 180° C. Although the curing time at such temperature may be selected as appropriate, a time of 5 minutes to 6 hours, especially 8 minutes to 5 hours is preferred.

The cured product of the composition should have a thermal conductivity at 25° C. of at least 1.0 W/m"K, preferably at least 1.2 W/m·K as measured by the hot disk method. If the thermal conductivity is less than 1.0 W/m·K, the cured product may be difficult to apply to heat-generating parts with a high exothermal capacity.

The cured product of the composition should preferably have a hardness (Asker E type hardness for soft rubber) of up to 60, more preferably up to 50 as measured by type E Durometer according to JIS K6253-3. The hardness is preferably at least 1. As long as the hardness is up to 60, the cured product may deform in conformity with the shape of an article to be heat-dissipated. That is, the cured product provides effective heat conduction without applying stress to the article to be heat-dissipated.

Since the cured product of the composition has a good heat conductivity, it is suitable as a heat transfer member to be interposed between a heat-generating part and a heat-dissipating part such as a heat sink or circuit board for transferring heat from the heat-generating part to the heat-dissipating part for heat dissipation.

The cured product of the composition is suitable as a heat transfer member for electric/electronic parts. Since the cured product also has good oil resistance, it can be used in an environment exposed to automobile fluids such as ATF and CVTF. Accordingly, the cured product is suited as a heat transfer member for use with automobile electric/electronic parts such as LED headlamps and ECUs as well as batteries, motors and converters mounted on next-generation automobiles like hybrid cars and electric vehicles.

EXAMPLE

Examples of the invention are given below by way of illustration and not by way of limitation. All parts are by weight (pbw). The viscosity of component (A) is measured at 23° C. according to JIS K7117-1. The average particle size of component (D) is a volume basis accumulative average particle size $D_{50}$ (or median diameter) as measured by a particle size analyzer Microtrac MT3300EX (Nikkiso Co., Ltd.)

The "weight loss" of component (E) upon heating at 105° C. for 3 hours is determined as follows. First, the tare weight ($W_1$) of a clean aluminum dish is measured using a precision balance (reading limit 0.1 mg). A sample of test material is then placed on the dish, and the weight ($W_2$) of the sample-containing aluminum dish is measured using the precision balance. The sample-containing aluminum dish is held in a thermostat chamber at 105° C. for 3 hours. After heating, the aluminum dish is taken out of the chamber and allowed to cool in a desiccator. After cooling, the weight $W_3$ of the sample-containing aluminum dish is measured again using the precision balance. Then the weight loss (% by weight) of this sample is computed according to the formula.

$$\{(W_3-W_1)/(W_2-W_1)\}\times 100\%$$

$W_1$: weight (g) of aluminum dish
$W_2$: weight (g) of aluminum dish+sample, prior to heating
$W_3$: weight (g) of aluminum dish+sample, after heating

Examples 1 to 6 and Comparative Examples 1 and 2

Compounds as components (A) to (G) and a hydrosilylation (addition) reaction inhibitor are shown below.

Component (A)
(A-1) A linear pulyfluoro compound (viscosity: 10,900 mPa·s, vinyl content: 0.0122 mol/100 g) of the following formula (21)

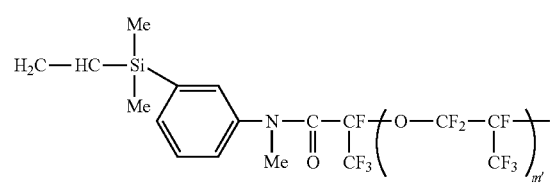

(21)

Herein m' and n' each are an integer of at least 1 and the sum of is 90 on average.

(A-2) A linear polyfluoro compound (viscosity: 11,000 mPa·s, vinyl content: 0.0122 mol/100 g) of the following formula (22)

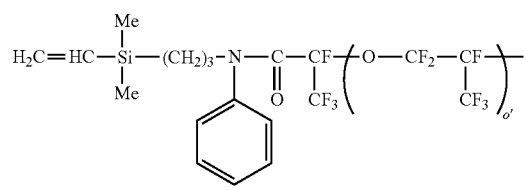

(22)

Herein o' and p' each are an integer of at least 1 and the sum of o'+p' is 90 on average.

Component (B)
(B-1) A fluorinated organohydrogensiloxane (SiH content: 0.0615 mol/100 g) of the following formula (23)

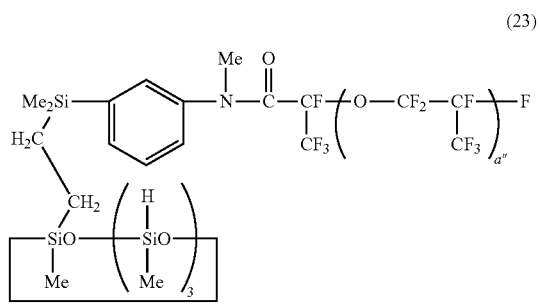

(23)

Herein a" is 24 on average.

Component (C)
(C-1) A platinum-divinyltetramethyldisiloxane complex in toluene (platinum concentration: 0.5 wt %)

Component (D)
Irregular alumina and spherical alumina having average particle sizes shown below.
(D-1) Irregular alumina having an average particle size of 1 μm
(D-2) Spherical alumina having an average particle size of 10 μm
(D-3) Spherical alumina having an average particle size of 45 μm
(D-4) Spherical alumina having an average particle size of 70 μm Component (E)
(E-1) A fluorinated organosilicon compound (weight loss upon 105° C./3 hours heating: 0.0 wt %) of the following formula (24)

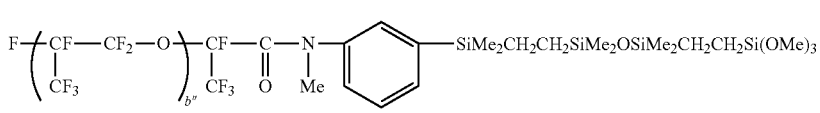

(24)

Herein b" is 24 on average.
(E-2) A fluorinated organosilicon compound (weight loss upon 105° C./3 hours heating: 28.9 wt %) of the following formula (25)

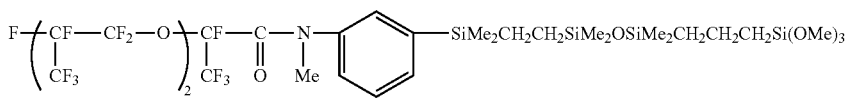

(25)

Component (F)
(F-1) A non-functional polyfluoro compound of the following formula (26)

(26)

Herein x' is 30 on average.
(F-2) A non-functional polyfluoro compound of the following formula (27)

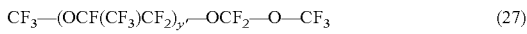

(27)

Herein y' is 17 on average.
Component (G)
(G-1) A polyfluoromonoalkenyl compound (vinyl content: 0.0239 mol/100 g) of the following formula (28)

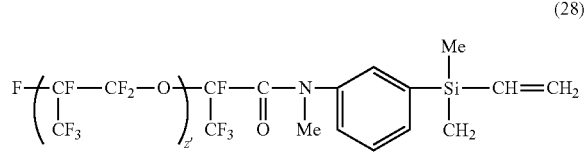

(28)

Herein z' is 24 on average.
Hydrosilylation Reaction Inhibitor
A compound of the following formula (29)

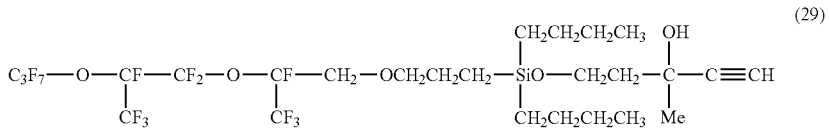

(29)

In Examples 1 to 6 and Comparative Examples 1 and 2, compositions were prepared using components (A) to (G) and the compound of formula (29) in the amounts shown in Tables 1 and 2, molded, and cured by the following methods. The compositions were evaluated for viscosity and the cured compositions measured for thermal conductivity and hardness by the following methods, with the results shown in Tables 1 and 2. The cured compositions were further evaluated for ATF durability by the following method, with the results shown Tables 3 and 4.

Preparation of Composition
Compositions were prepared by kneading components (A), (D), (E), (F) and (G) on a planetary mixer for 1 hour, then adding component (C) and the compound of formula (29) and kneading for 30 minutes, and finally adding component (B) and kneading for 30 minutes. The amounts of components are shown in Tables 1 and 2.

Preparation of Cured Product
The resulting composition was cast into a mold of 60 mm×60 mm×6 mm and cured at 120° C. for 10 minutes on a press molding machine, yielding a sheet-like cured product of 6 mm thick.

Viscosity of Composition
The viscosity of the composition was measured at 23° C. by a rotational rheometer HAAKE® RotoVisco® 1 (Thermo Fisher Scientific Inc.).

Thermal Conductivity of Cured Product
Two pieces of the sheet-like cured product (6 mm thick) were used to measure thermal conductivity at 25° C. by a thermal property analyzer TPS2500S (Kyoto Electronics Manufacturing Co., Ltd.).

Hardness of Cured Product
Two pieces of the sheet-like cured product (6 mm thick) were laid one on another, which was measured for hardness by type E Durometer according to JIG K6253-3.

ATF Durability of Cured Product
The sheet-like cured product (6 mm thick) was immersed in an automatic transmission fluid ATF WS3324 (Toyota Motor Corp.) at 150° C. for 1,000 hours, after which thermal conductivity was measured by the same method as above. Comparative Example 3 used a heat-conductive dimethylsilicone rubber sheet. TC-600CAS-10 (Shin-Etsu Chemical Co., Ltd., a sheet of 6 mm thick), which was similarly measured for thermal conductivity.

TABLE 1

| Component (pbw) | | Example 1 | Example 2 | Example 3 | Example 4 |
|---|---|---|---|---|---|
| Component (A) | (A-1) | 100 | — | 100 | — |
|  | (A-2) | — | 100 | — | 100 |
| Component (B) | (B-1) | 18.9 | 17.9 | 17.7 | 19.8 |
| Component (C) | (C-1) | 0.60 | 0.60 | 0.60 | 0.60 |
| Component (D) | (D-1) | 320 | — | 500 | 700 |
|  | (D-2) | — | — | — | 200 |
|  | (D-3) | — | 500 | 300 | 200 |
|  | (D-4) | — | — | — | 200 |
| Component (E) | (E-1) | 20.0 | 100 | 120 | — |
|  | (E-2) | — | — | — | 130 |
| Component (F) | (F-1) | — | — | — | 20.0 |
|  | (F-2) | — | — | — | — |
| Component (G) | (G-1) | — | — | — | — |
| Reaction inhibitor (compound of formula (29)) | | 0.50 | 0.50 | 0.50 | 0.50 |
| SiH/vinyl (number ratio) | | 0.95 | 0.90 | 0.89 | 1.0 |
| Evaluation results | | | | | |
| Viscosity of composition (Pa·s) | | 194 | 146 | 217 | 286 |
| Thermal conductivity of cured product (W/m·K) | | 1.0 | 1.0 | 1.3 | 1.8 |
| Hardness of cured product (Durometer E) | | 36 | 21 | 3 | 12 |

TABLE 2

| Component (pbw) | | Example 5 | Example 6 | Comparative Example 1 | Comparative Example 2 |
|---|---|---|---|---|---|
| Component (A) | (A-1) | 100 | 100 | 100 | 100 |
|  | (A-2) | — | — | — | — |
| Component (B) | (B-1) | 21.8 | 24.4 | 18.9 | 18.9 |
| Component (C) | (C-1) | 0.60 | 0.60 | 0.60 | 0.60 |
| Component (D) | (D-1) | 800 | 800 | 200 | 2,000 |
|  | (D-2) | 300 | 400 | — | 800 |
|  | (D-3) | 200 | 400 | — | 700 |
|  | (D-4) | 200 | 400 | — | 700 |
| Component (E) | (E-1) | 150 | 40.0 | — | 290 |
|  | (E-2) | — | — | — | — |
| Component (F) | (F-1) | — | — | — | — |
|  | (F-2) | — | 140 | — | — |
| Component (G) | (G-1) | 5.0 | 15.0 | — | — |
| Reaction inhibitor (compound of formula (29)) | | 0.50 | 0.50 | 0.50 | 0.50 |
| SiH/vinyl (number ratio) | | 1.0 | 0.95 | 0.95 | 0.95 |
| Evaluation results | | | | | |
| Viscosity of composition (Pa·s) | | 742 | 1,280 | non-grease | non-grease |
| Thermal conductivity of cured product (W/m·K) | | 2.2 | 2.7 | un-measurable | un-measurable |
| Hardness of cured product (Durometer E) | | 8 | 20 | un-measurable | un-measurable |

TABLE 3

| | Example 1 | Example 2 | Example 3 | Example 4 |
|---|---|---|---|---|
| Thermal conductivity of cured product before ATF immersion (W/m·K) | 1.0 | 1.0 | 1.3 | 1.8 |
| Thermal conductivity of cured product after ATF immersion (W/m·K) | 1.0 | 1.0 | 1.3 | 1.8 |

TABLE 4

| | Example 5 | Example 6 | Comparative Example 3 |
|---|---|---|---|
| Thermal conductivity of cured product before ATF immersion (W/m·K) | 2.2 | 2.7 | 1.8 |
| Thermal conductivity of cured product after ATF immersion (W/m·K) | 2.2 | 2.7 | 0.9 |

As seen from Tables 1 and 2, the heat-conductive fluorinated curable compositions of Examples 1 to 6 were uniform grease compositions. In contrast, the composition of Comparative Example 1 which lacked component (E) did not become a uniform grease composition because component (D) was insufficiently wettable to component (A). The composition of Comparative Example 2 which contained more than 4,000 pbw of component (D) did not become a uniform grease composition because component (D) was insufficiently wettable to component (A).

As seen from Tables 3 and 4, the cured products of the heat-conductive fluorinated curable compositions of Examples 1 to 6 did not change their thermal conductivity before and after ATF immersion. In contrast, the heat-conductive dimethylsilicone rubber sheet of Comparative Example 3, included as reference, underwent a substantial drop of thermal conductivity after ATF immersion.

It has been demonstrated that the heat-conductive fluorinated curable composition of the invention may be loaded with 100 to 4,000 pbw of component (D) per 100 pbw of component (A). The cured product of the composition has excellent oil resistance and heat conduction and is thus suited as a heat transfer member for use with electric/electronic parts, especially automobile electric/electronic parts.

It is noted that the invention is not limited to the aforementioned embodiments. While the embodiments are merely exemplary, any embodiments having substantially the same construction as the technical concept set forth in the following claims and exerting equivalent functions and results are believed to be within the spirit and scope of the invention.

Japanese Patent Application No. 2015-211935 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat-conductive fluorinated curable composition comprising:
   (A) 100 parts by weight of a linear polyfluoro compound containing at least two alkenyl groups in the molecule and having a perfluoropolyether structure in its backbone,
   (B) a fluorinated organohydrogensiloxane having a monovalent perfluoroalkyl, monovalent perfluorooxyalkyl, divalent perfluoroalkylene or divalent perfluorooxyalkylene group and at least two silicon-bonded hydrogen atoms (i.e., SiH groups) in the molecule, and being free of a silicon-bonded alkoxy group, component (B) being present in an amount to give 0.50 to 3.0 moles of SiH groups per mole of alkenyl groups in the composition, (C) a platinum group metal based catalyst in an amount to give 0.1 to 2,000 ppm of platinum group metal based on component (A),
(D) 100 to 4,000 parts by weight of a heat-conductive filler, and
(E) 0.01 to 300 parts by weight of a fluorinated organosilicon compound having at least one monovalent perfluoroalkyl or monovalent perfluorooxyalkyl group and at least one silicon-bonded alkoxy group in the molecule, and being free of a SiH group,
wherein a cured product obtained by curing said composition has a thermal conductivity of at least 1.0 W/m·K at 25° C., and
wherein component (A) is at least one linear polyfluoro compound selected from compounds having formulae (4) and (5):

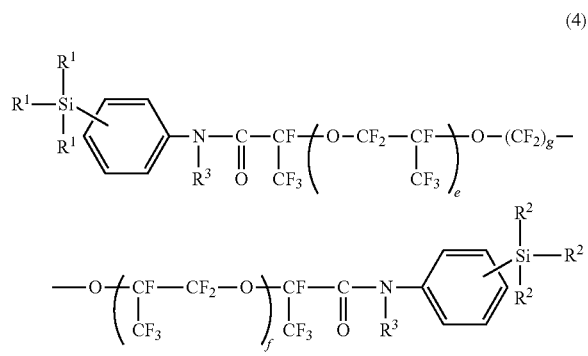

wherein $R^1$ and $R^2$ are each independently alkenyl or a substituted or unsubstituted monovalent hydrocarbon group free of aliphatic unsaturation, with the proviso that at least two of groups $R^1$ and $R^2$ are alkenyl, each $R^3$ is independently hydrogen or a substituted or unsubstituted monovalent hydrocarbon group, e and f each are an integer of 1 to 150, the sum of e+f is 2 to 300 on average, and g is an integer of 1 to 6,

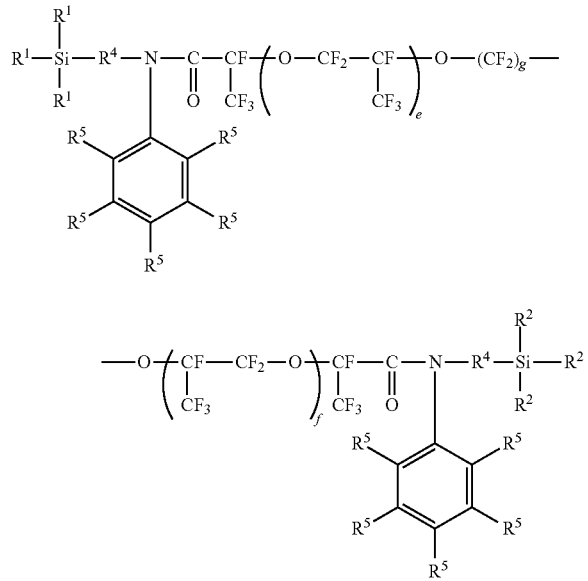

wherein each $R^4$ is independently a $C_1$-$C_6$ alkylene group, each $R^5$ is independently hydrogen or an optionally fluorinated $C_1$-$C_4$ alkyl group, and $R^1$, $R^2$, e, f and g are as defined above.

2. The composition of claim 1, further comprising (F) 0.1 to 300 parts by weight of at least one non-functional polyfluoro compound selected from compounds having the general formulae (1) and (2):

$$F—(CF_2CF_2CF_2O)_a\text{-}A \quad (1)$$

wherein A is a group: $—C_bF_{2b+1}$ wherein b is an integer of 1 to 3, and a is an integer of 1 to 500, $$A\text{-}\{(OCF(CF_3)CF_2)_c—(OCF_2CF_2)_d—(OCF_2)_{u'}\}—O\text{-}A \quad (2)$$

wherein A is as defined above, c and d each are an integer of 0 to 300, and u' is an integer of 1 to 300, excluding that both c and d are 0.

3. The composition of claim 1, further comprising (G) 0.1 to 100 parts by weight of a polyfluoromonoalkenyl compound containing one alkenyl group in the molecule and having a perfluoropolyether structure in its backbone.

4. The composition of claim 1 wherein the linear polyfluoro compound (A) has an alkenyl content of 0.0050 to 0.300 mole/100 g.

5. The composition of claim 1 wherein the perfluoropolyether structure in component (A) contains a structure of the general formula (3):

$$—(C_mF_{2m}O)_n— \quad (3)$$

wherein m is an integer of 1 to 6 and n is an integer of 1 to 300.

6. The composition of claim 1 wherein component (D) is at least one filler selected from the group consisting of metals, metal oxides, metal nitrides, metal hydroxides, metal carbides, soft magnetic alloys, and ferrites.

7. The composition of claim 6 wherein component (D) is alumina.

8. The composition of claim 7 wherein component (D) is irregular alumina and/or spherical alumina.

9. The composition of claim 8 wherein the irregular alumina as component (D) has an average particle size of 0.2 to 5.0 μm.

10. The composition of claim 8 wherein the spherical alumina as component (D) has an average particle size of 5.0 to 100 μm.

11. The composition of claim 1 wherein component (E) is a fluorinated organosilicon compound having at least one monovalent perfluoroalkyl or monovalent perfluorooxyalkyl group which is bonded to the silicon atom having alkoxy directly bonded thereto, via a divalent hydrocarbon group which may contain carbon, silicon, oxygen and nitrogen atoms.

12. The composition of claim 1 wherein component (E) is a fluorinated organosilicon compound having the general formula (6):

$$D_{g'}R^{14}_{h'}Si(OR^6)_{4-g'-h'} \quad (6)$$

wherein D is each independently a monovalent perfluoroalkyl or monovalent perfluorooxyalkyl group which is bonded to the silicon atom having alkoxy directly bonded thereto, via a divalent hydrocarbon group which may contain carbon, silicon, oxygen and nitrogen atoms, $R^6$ is each independently $C_1$-$C_6$ alkyl, $R^{14}$ is each independently a substituted or unsubstituted monovalent hydrocarbon group, g' is an integer of 1 to 3, h' is an integer of 0 to 2, and the sum of g'+h' is an integer of 1 to 3.

13. The composition of claim 1 wherein component (E) has a weight loss of no more than 50.0% by weight upon heating at 105° C. for 3 hours.

14. The composition of claim 3 wherein component (G) is a polyfluoromonoalkenyl compound having the general formula (7):

$$Rf-(Y)_h-CH=CH_2 \tag{7}$$

wherein Rf is a group having the formula (8):

$$F-[CF(CF_3)CF_2O]_i-C_jF_{2j}- \tag{8}$$

wherein i is an integer of 1 to 200 and j is an integer of 1 to 3, Y is —$CH_2$—, —$OCH_2$—, —$CH_2OCH_2$— or —CO—$NR^{15}$—Z—, which is bonded at the left end to Rf and at the right end to the carbon atom, $R^{15}$ is hydrogen, methyl, phenyl or allyl, Z is —$CH_2$—, an o-, m- or p-dimethylphenylsilylene group having the structural formula (Z):

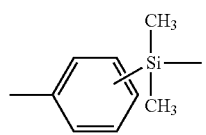 (Z)

which is bonded at the left end to the nitrogen atom and at the right end to the carbon atom, or a group having the structural formula (Z'):

 (Z')

which is bonded at the left end to the nitrogen atom and at the right end to the carbon atom, and h is 0 or 1.

15. The composition of claim 1 which has a viscosity of up to 2,000 Pa·s at 23° C.

16. A heat-conductive fluorinated cured product obtained by curing the heat-conductive fluorinated curable composition of claim 1.

17. The cured product of claim 16 which has a hardness of up to 60 as measured by a type E Durometer according to JIS K6253-3.

18. The cured product of claim 16 which is a heat transfer member to be interposed between a heat-generating part and a heat-dissipating part for transferring heat from the heat-generating part to the heat-dissipating part for heat dissipation.

19. An electric/electronic part comprising the cured product of claim 16.

20. The electric/electronic part of claim 19 which is used on automobiles.

* * * * *